United States Patent [19]

Gabrielli et al.

[11] Patent Number: 4,611,321
[45] Date of Patent: Sep. 9, 1986

[54] VARIABLE-BAND DISTRIBUTED SWITCHING NODE WITH DYNAMIC HYBRID-FRAME PROCESSING

[75] Inventors: Luciano Gabrielli, Leini; Nicola Lotito, Avigliana; Maurizio Sposini, Valdellatorri, all of Italy

[73] Assignee: CSELT—Centro Studi e Laboratori Telecommunicazioni S.p.A., Turin, Italy

[21] Appl. No.: 638,353

[22] Filed: Aug. 6, 1984

[30] Foreign Application Priority Data

Aug. 4, 1983 [IT] Italy ................................ 67845 A/83

[51] Int. Cl.$^4$ ........................................ H04Q 11/04
[52] U.S. Cl. ........................................ 370/60; 370/67
[58] Field of Search ................ 370/60, 94, 89, 85, 370/58, 67

[56] References Cited

U.S. PATENT DOCUMENTS

| 4,154,983 | 5/1979 | Pedersen | 370/89 |
| 4,446,555 | 5/1984 | DeVault et al. | 370/94 |
| 4,482,999 | 11/1984 | Janson et al. | 370/60 |

FOREIGN PATENT DOCUMENTS 2113953 8/1983 United Kingdom .................. 370/60

OTHER PUBLICATIONS

"A Distributed Processing Architecture for Voice/Data Switching", by Ross et al., Naecon 1981, Proceedings of the IEEE 1981, National Aerospace & Electronics Conf., Dayton Ohio (19–21 May 1981).

Engineering Aspects of Tasi by K. Bullington et al —pp. 353-365, The Bell System Technical Journal, Mar. 1959.

Digital Speech Interpolation by S. J. Companella —pp. 127-159, version of this paper was presented at the Intelsat/Iece/Ite 3rd International Conference in Kyoto, Japan, Nov. 11-13, 1975.

"Design Approaches and Performance Criteria for Integrated Voice/Data Switching", Proceedings of the IEEE, vol. 65, No. 8, Sep. 1977, p. 1283 ff.

"An Architecture for a Flexible Integrated Voice/Data Switch", by M. J. Ross et al., presented at the International Conference on Communication, Seattle, 8–12, Jun. 1980.

"Asynchronous Time Division Switching: A New Concept for ISDN Nodes", presented at ISS' 81, (Montreal, 21-25 Sep. 1981.

Primary Examiner—Douglas W. Olms
Attorney, Agent, or Firm—Karl F. Ross; Herbert Dubno

[57] ABSTRACT

A variable-band distributed switching node comprises a plurality of independent modules ($MU_1 \ldots MG_m$) inserted between subscriber or trunk lines and a common bus (1). Each module includes an input/output portion (IU, HL, SL, PL), processing line information, and an interface (IB) toward the bus which co-operates with the interfaces of the other modules to form hybrid frames on the bus. These frames are each divided into a first region RC, encompassing a plurality of channels assigned to circuit-switched communications, and a residual-band second portion RP shared by packet-switched communications. Such frames are dynamically managed by assigning to each circuit-switched channel a band which can differ in consecutive frames to satisfy the requirements of variable-band sources and by recompacting the channels remaining in region RC after each channel release.

8 Claims, 26 Drawing Figures

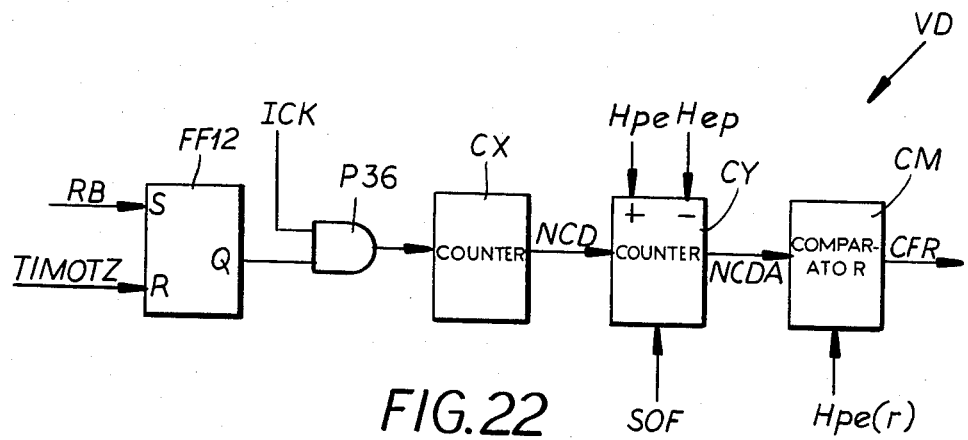
FIG.22
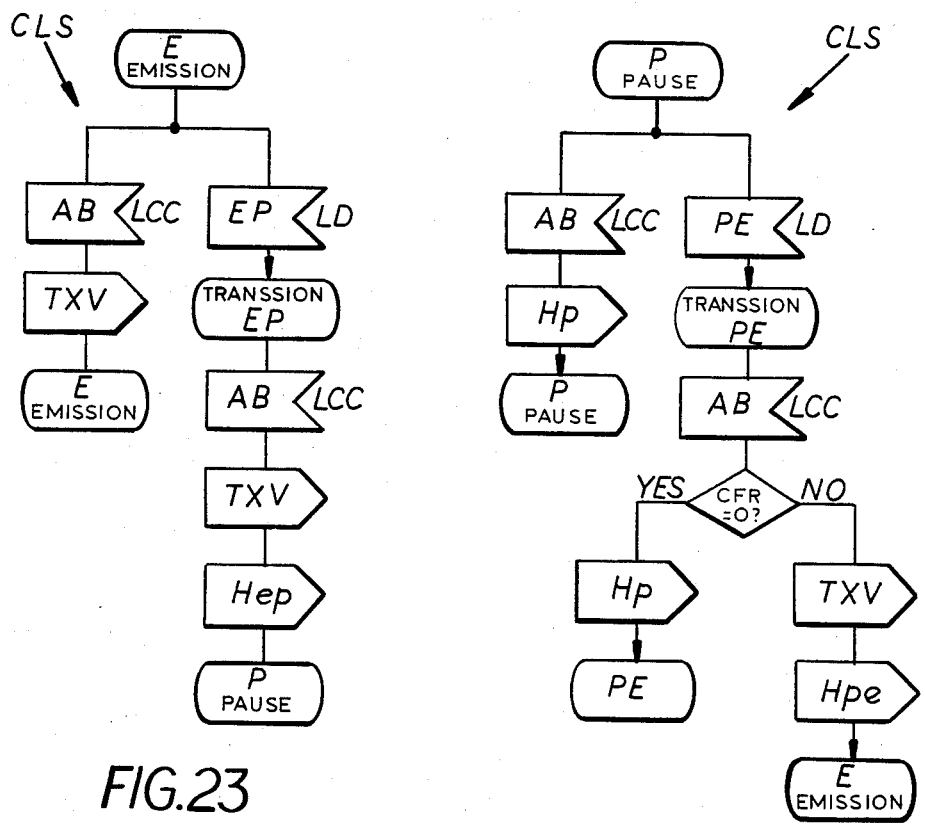
FIG.23
FIG.24

VARIABLE-BAND DISTRIBUTED SWITCHING NODE WITH DYNAMIC HYBRID-FRAME PROCESSING

FIELD OF THE INVENTION

Our present invention relates to private or public integrated-services networks, more particularly to a variable-band distributed switching node forming part thereof.

BACKGROUND OF THE INVENTION

An integrated-services network, as known, employs the same transmitting and switching units for a wide range of services (telephone, video, data transmission etc.) with quite different characteristics such as:

transmission rates (and consequently band occupation) widely differing from one another, and possibly variable (e.g. from some kbit/s to many Mbit/s);

circuit or packet switching depending on whether or not the information flow presents synchronous characteristics;

maximum accepted delay ranging from few milliseconds to some hours.

In these systems it has proved advantageous to subdivide the network activity into repetitive frames, each composed of two regions respectively assigned to circuit-switched communications (basically time-division multiplexed, so that each call is allotted a time slot or channel of duration proportional to transmission rate) and to packet-switched communications. These frames are generally referred to as hybrid frames.

With such an organization of the information flow, the switching nodes in the network ought to have the flexibility necessary to process each communication according to its characteristics, without imposing restraints on transmission modalities and while reducing to a minimum any format changes in the information flow.

Such nodes are generally called "asynchronous nodes".

A number of realizations of these asynchronous nodes are known in the art.

A first solution is described by M. J. Ross, A. C. Tabbot and J. A. Waite in the paper titled "Design Approaches and Performance Criteria for Integrated Voice/Data Switching" (Proceedings of the IEEE, Vol. 65, No. 9, September 1977, pages 1283 ff.) and by M. J. Ross, J. H. Gottschalk and E. A. Harrington in a paper titled "An architecture for a flexible integrated voice/data switch", presented at the International Conference on Communication, Seattle, 8–12 June 1980.

According to this system a node comprises a plurality of modules connected on one side to subscribers or trunks conveying hybrid frames and on the other side to a pair of common buses for signalization and for data, respectively; a single nodal module, also connected to the two buses, having routing and supervising functions; and a timing module. For each communication the information arriving from subscribers or trunks is stored inside the respective module, basically at the instant at which it arrives; such information is presented on the bus upon request of the addressee module in a time phase in which that module can access the bus.

Hence the operation inside the node is synchronous, as each module is assigned a predetermined time slot. A solution of this kind simplifies the information-transfer procedures but presents a number of inconveniences; on account of the fixed-duration intervals for information reading, the node satisfactorily processes circuit-switched communications but is scarcely efficient for wide-band or packet-switched communications inasmuch as information-flow splitting may be required. The single timing module which is to carry out the most important system functions operates as a reliability node. A further limitation on the efficiency of the node is that an interval assigned to one module cannot be used by other modules even if that module has no operation to carry out; node-capacity expansion can require a modification of the nodal and timing modules.

A second solution has been described by M. Devault, J. P. Quinquis and Y. Ronaud in a paper titled "Asynchronous time division switching: a new concept for ISDN nodes", presented at ISS'81 (Montreal, 21-25 September 1981).

According to this latter solution a node consists of a plurality of modules coupled to local lines or trunks and interconnected by a set of buses allowing complete and direct accessibility from one module to any other. Inside the node the information relevant to the input and output channels (time solts) is associated with each sample of a circuit-switched communication or with each packet incoming to the node, and blocks are formed which are asynchronously switched by following substantially a packet-switching procedure.

Thus, problems relevant to the presence of centralized modules are avoided, and variable-band communications can be processed; however, signal processing is needed also for circuit-switched communications, which moreover require reduction of the variability of transit delay through the network since such delay, as known, can degrade communication quality.

The use of hybrid frames for information exchange within a communication system is described for instance in commonly owned U.S. application Ser. No. 502,084 filed by me jointly with another on June 8, 1983. Tha prior application, however, concerns the information exchange among different nodes of a switching system and not inside a node; besides, it requires the frame-by-frame memorization of the activity on the bus and therefore does not allow dynamic management of hybrid frames with variation in the band assigned to each synchronous communication and with frame-by-frame channel recompaction.

OBJECT OF THE INVENTION

The object of our invention is to provide an improved switching node of the type discussed enabling both wide-band and variable-band processing of packet-switched as well as circuit-switched communications.

SUMMARY OF THE INVENTION

A distributed switching node embodying my invention, forming part of an integrated-services telecommunication network handling circuit-switched and packet-switched communications, comprises a plurality of independent modules each communicating with at least one external line as well as with an internal bus common to all modules. The lines may be local ones, extending to respective subscriber stations, or trunk lines extending to other nodes.

Each module is divided into an input/output portion, communicating with the associated external line, and an interface portion with a two-way connection to the bus whereby incoming and outgoing communications can be exchanged among all lines by way of the assocated modules and the bus. The input/output portion includes first flow-control means for handling packet-switched communications and second flow-control means for handling circuit-switched communications. The interface portion includes first access means for enabling a transfer of packet-switched communications between the first flow-control means and the bus, in either direction, and second access means for enabling a bidirectional transfer of circuit-switched communications between the second flow-control means and the bus.

Logic circuitry included in the second access means serves to form hybrid frames each divided into a circuit region and a packet region each accommodating a plurality of channels for outgoing and incoming circuit-switched communications and for outgoing and incoming packet-switched communications, respectively, in time slots of variable band length and number. The channels of the circuit region are established in response to request signals arriving in the packet region from the first access means and carrying communications of the required band length; each channel of the circuit region is numerically identified for facilitating a foreshortening of that region upon the release of the preceding channel.

BRIEF DESCRIPTION OF THE DRAWING

The above and other features of our invention will now be described in detail with reference to the accompanying drawing in which:

FIGS. 6-10, 11a and 12 are circuit diagrams of various blocks seen in FIGS. 4 and 5 with FIGS. 11b, 11c showing graphs relating to FIG. 11a;

FIG. 22 is a circuit diagram of a device checking availability of speech channels in the module of FIG. 21; and FIGS. 23 and 24 are flow charts of the operations of the modification of FIG. 21.

SPECIFIC DESCRIPTION

Figure 1:
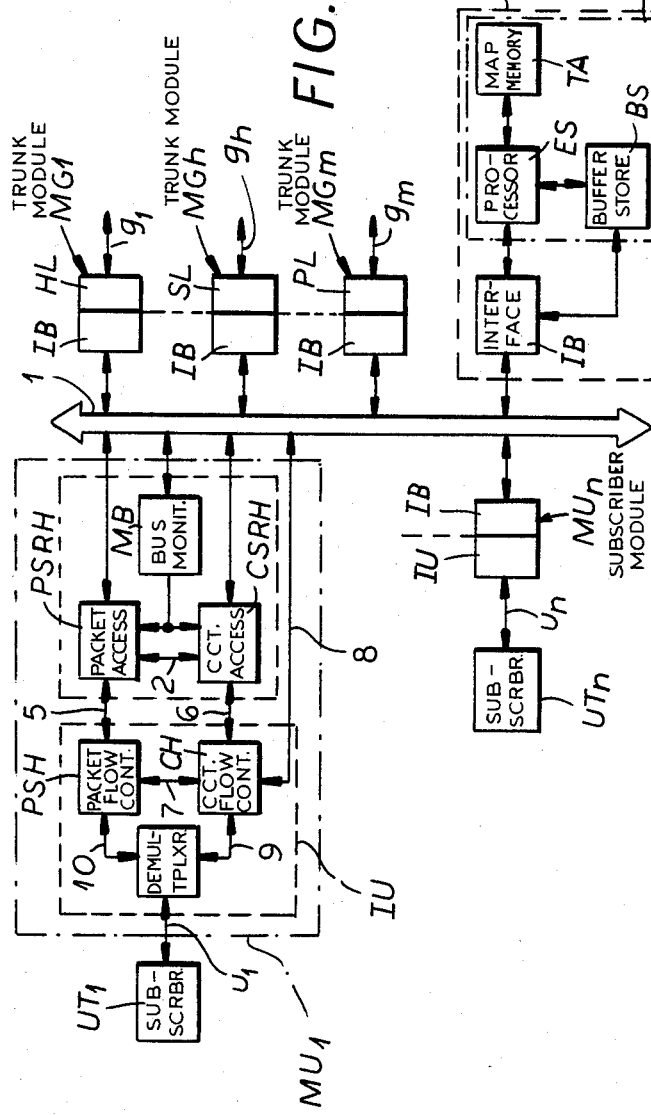
FIG. 1 is a block diagram showing the general structure of a switching node embodying the invention.

As shown in FIG. 1, a distributed switching node for handling hybrid frames in an integrated-services network comprises a plurality of independent modules connected to a bidirectional common bus 1 on which the information emitted from a module is rendered available to all the others. Subscriber lines $u_1 \ldots u_n$ link subscriber stations $UT_1 \ldots UT_n$ with respective subscriber modules $MU_1 \ldots MU_n$ for the conveyance of circuit-switched and/or packet-switched communications; trunks $g_1 \ldots g_h \ldots g_m$ respectively convey hybrid frames, PCM frames or packets to trunk modules MG1 $\ldots$ MGh $\ldots$ MGm. A nodal module MN carries out those functions which are conveniently centralized.

Subscriber and trunk modules can each be considered subdivided into two parts. The first part IB is equal for all the modules, interfaces the respective module with bus 1 and co-operates with interfaces IB of all the other modules to form on the bus a hybrid frame (occasionally referred to hereinafter as a main frame). The second part, handling line information, is an input/output portion specialized according to the type of module; that second part is denoted by IU for the subscriber modules and by HL, SL, PL, respectively, for trunk modules connected to trunks conveying hybrid frames (MG1), PCM frames (MGh) or packets (MGm). It is worth noting that hybrid frames transmitted on the several trunks and those relevant to the two transmission directions on the same trunk are asynchronous with respect to one another. As to PCM frames, a common channel signalization is assumed—e.g. according to CCITT system No. 7—which is processed inside the node by packet techniques.

Also nodal module MN can be considered as consisting of two parts, namely a part IB, performing the same tasks as in modules MU and MG, and a part C containing the map of the associations between subscribers and parts IB as well as possible data relating to charges and the like. For the purposes of the present invention the functions of part C, apart from those relating to routing, are of no interest.

Part C of module MN comprises a buffer BS for the temporary storage of the signalization arriving from or addressed to modules MU, MG; further included therein are a processor ES, which recognizes and acts upon the incoming signalization and prepares the outgoing signalization, and a memory TA for routing maps, connected to processor ES.

As indicated for subscriber module $MU_1$, interface IB comprises:

a component or block PSRH, managing the frame region which is to be packet-switched, thereby controlling the access to the bus for transmission and reception of data packets and of signalization packets of circuit-switched communications;

a component or block CSRH controlling the access to the bus for reception and transmission of circuit-switched channels and managing the main frame;

a component or block MB monitoring the activity of the bus, connected to both components PSRH and CSRH.

As component PSRH processes also the signalization relating to circuit communications, it must exhange information with component CSRH as schematically indicated by a line 2.

Components PSRH, CSRH are connected to a component or block PSH, managing and processing the information flow relating to packet-switched communications and the signalization of circuit-switched communications, and to a component or block CH managing and processing the information flow relevant to circuit-switched communications. Connections among blocks PSRH, CSRH and PSH, CH are schematically indicated by lines 5 and 6.

A link between blocks PSH and CH, represented by a line 7, is also provided for the same reasons for which blocks PSRH and CSRH are interconnected; a link 8 connects block CH with bus 1, as the information flow relative to circuit-switched communications does not require processing in block CSRH.

Blocks PSH, CH are connected to a demultiplexer AH separating data packets, signalization and the information flow of circuit-switched communications, forwarding them to block PSH or CH, as the case may be, through respective connections 9, 10.

The structure of demultiplexer AH will obviously depend upon frame organization on the subscriber lines.

Blocks AH, PSH, CH jointly form the specialized input/output portion IU of the module.

The general structure of blocks HL, SL is identical with that of block IU; as far as part PL of module MGm is concerned, block CH is not required.

Figure 2:
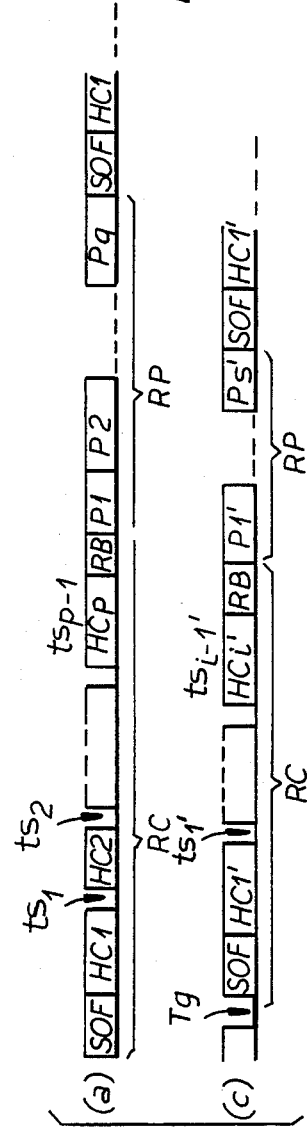
FIG. 2 shows the structure of a hybrid frame on the node bus.

Graph (a) of FIG. 2 shows the structure of the main hybrid frame conveyed on bus 1. This frame is formed only in response to a first request for establishment of a circuit-switched communication (signaled by a booking or pre-engagement packet) and is maintained only if there are circuit-switched communications in progress; otherwise, the whole activity takes place according to usual packet-switching techniques. A frame is initiated by a start-of-frame flag or marker SOF and is split into two regions allotted to circuit-switched and packet-switched communications, respectively; the two regions are separated by a boundary flag RB. The frame end is not expressly signaled but can be recognized by the starting flag SOF of the subsequent frame.

The first region RC ("circuit region") is composed of a plurality of time slots or channels HC1...HCp whose length depends on the characteristics of the individual communications and which are each assigned to one communication direction. The second region RP ("packet region") comprises a number of packets P1...Pp depending on the band availability for packet traffic; under low-traffic conditions region RP can be partly or totally unused.

Flag SOF is emitted by the station the first channel is assigned to, on the appropriate wire of bus 1, and must have a duration longer than twice the round-trip delay Tr; this is meant to establish a guard time Tg between the end of the packet region and the beginning of the next frame, designed to avoid collisions among the packets of one frame and the circuit channels of the other.

Adjacent channels in circuit region RC are separated in turn by an inactivity time $ts_1...ts_{p-1}$ which depends on mutual channel position and is usually shorter than guard time Tg. The end of time Tg indicates the absence of a channel in a frame and thus the end of the corresponding communication. The bus activity is recognized by the presence of clock signals emitted by the active module on an appropriate wire of bus 1. FIG. 2 does not show the guard times between adjacent packets since, as known, they can be obtained by suitable markers incorporated in the packet itself, depending on the managing protocol adopted.

The regional boundary flag RB is emitted on an appropriate wire of bus 1 by the module processing the last channel of the circuit region RC. The relative extent of the two regions RC, RP can vary from frame to frame depending on the intensity of circuit-switched traffic, and the whole frame could even be devoted to this type of traffic.

In the most general case, the bands assigned to the individual channels can also vary from one frame to another.

The necessity for these variations may be due, in case of speech communications, to the passage from a period of active signaling to a silent period or vice versa, and in case of video transmissions with adaptive differential coding of the information to variations in the quantity of information to be transmitted.

On the other hand, the maximum frame duration is quasi-constant and corresponds basically to the longest interval which can separate two information blocks of a circuit-switched communication without degrading the transmission quality. The limitation "quasi" takes into account that, according to the present invention, the emission of flag SOF is effected by the module processing the first channel of the circuit region; therefore, in case of release of one or more initial channels during a frame which has a duration Z, flag SOF in the subsequent frame is not exactly emitted after a time Z past the flag of the preceding frame but after a time Z increased by one or more guard times Tg.

Of course also the minimum frame duration cannot decrease under a certain limit. In the frame shown in graph (b) of FIG. 2 the release of the first channel HC1 of graph (a) has been assumed, so that between the last packet Pr' of the region RP of the preceding frame and the emission of flag SOF there is an interval Tg. Flag SOF is now associated with the new first active channel HC1', corresponding for instance to channel HC2 in graph (a). Flag RB is emitted by the last channel HCi', which corresponds for instance to the last channel HCp of the frame of graph (a); region RC requires now a reduced band. As to frame formation and management, when one of the modules MU, MG is to establish the first communication to be circuit-switched, it transmits on the bus through interface IB the booking packet which, when received by interfaces IB of the other modules, starts therein the count of time Z and causes storage of the information that a circuit channel is awaited.

Until the end of time Z the bus remains available for packet traffic. Possible other requests (CRP) for channels, sent by other modules, are queued to the first and entail the updating of the number NCA of channels awaited and the memorization of the respective channel position (NCP).

Once time Z is over, the interface processing the first active channel of region RC stops the ongoing packet activity (both in transmission and in reception) and enables the transmission of flag SOF; afterwards it enables the transmission of the information relating to the circuit.

The reception of flag SOF entails, in the other modules, on the one hand the synchronization of the counters of time Z and on the other hand the immediate interruption of any ongoing packet activity.

Once all the NCA channels waited for have been handled, the interface relating to the last active circuit enables the transmission of flag RB indicating the beginning of the packet region. The same procedure repeats for the subsequent frames, during which new circuit channels are requested by the sending of a packet CRP during region RP of the frame.

The channel request by packet CRP does not entail, by the access interface IB involved, a preliminary check of the actual band availability on the bus; that is why the single transmission of packet CRP does not ensure the actual channel acquisition for the interface. Packet CRP does not contain the information on the requested band, as it only aims at informing the other interfaces of the channel request by the sending interface. To check such availability, in the subsequent frame—according to the allotted channel—the module sends onto the bus a signal block without information content, having a length equivalent to the desired band. Only when the transmission of this block has not been interrupted by the arrival of flag SOF of the subsequent frame, the channel is actually assigned to the module.

The intention of releasing a channel by a module is implicitly signaled to the other modules by inhibiting transmission in the channel involved. The absence of the channel is detected by all the other modules by the elapse of guard time Tg.

The channel release gives rise to a correspondent reduction in circuit-region extent and to the renumbering of the active channels.

The release of all channels is detected by the lack of signal SOF and causes recovery of a free activity for packet traffic without any band restriction.

Packet access to the bus is controlled by any known protocol, e.g. the one known as CSMA-CD (for "Carrier-Sense Multiple-Access Collision Detector").

The structure of components PSRH, CSRH, CH will be now described in greater detail for an exemplary embodiment of my invention in which the band assigned to the individual communications, as well as the frame duration (apart from the fluctuations due to the release of one or more channels), have been assumed to be constant.

Figure 3:
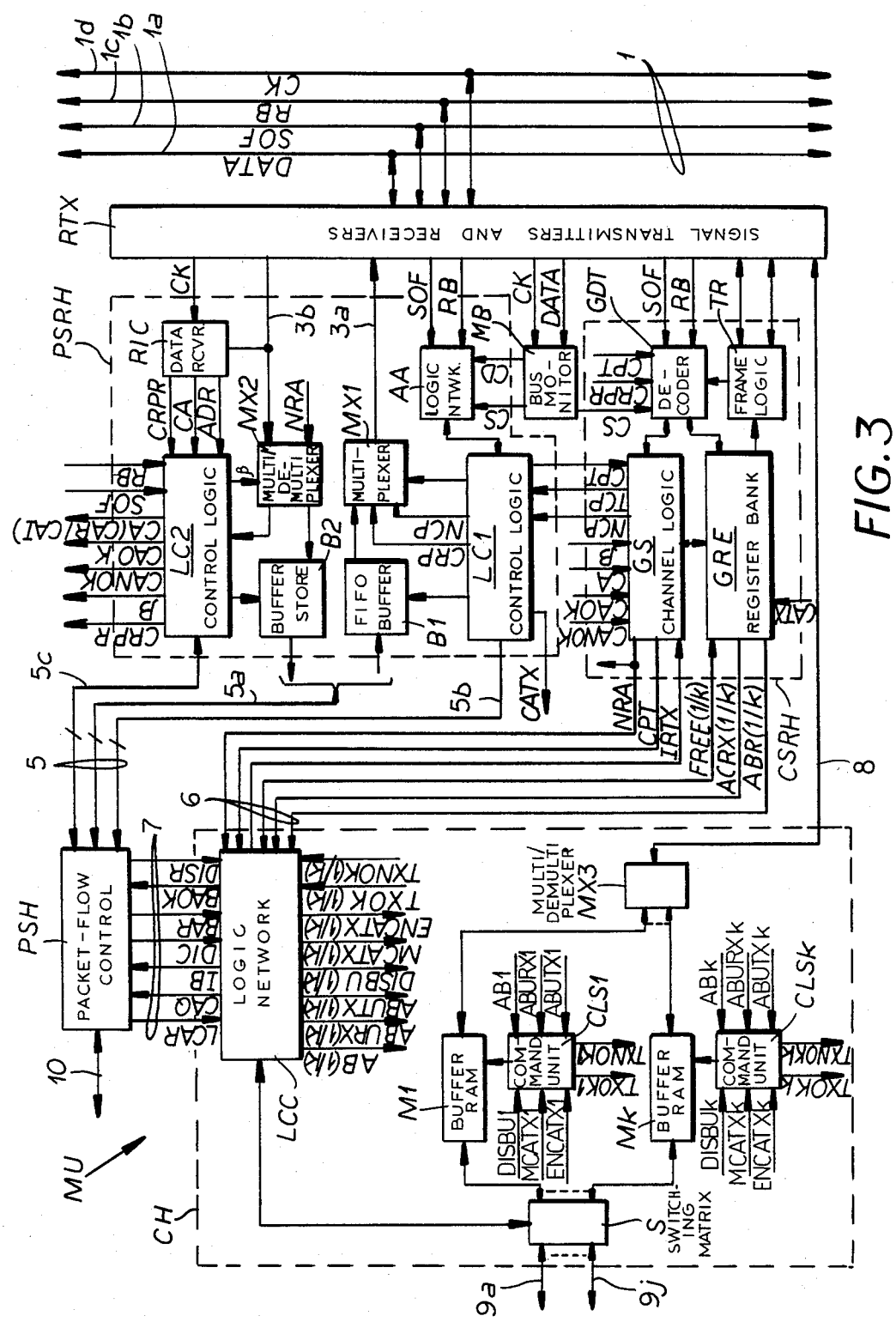
FIG. 3 is a block diagram of a subscriber's module included in the node of FIG. 1.

As seen in FIG. 3, bus 1 is split into four wires 1a, 1b, 1c, 1d on which data, flags SOF, RB and clock signals CK are respectively present. A block RTX symbolizes a set of signal transmitters and receivers allowing decoupling of the bus from components CSRH, PSRH, MB.

Block PSRH is subdivided into two different parts designed for transmission to and reception from the bus. The transmitting part serves to acquire the bus control according to the afore-described access algorithm, to forward over the bus the packets sent by block PSH, to complete signalization packets CAR, CAI (which indicate a request for opening a receiving channel and are sent by a calling and a called party, respectively) with the relevant channel numbers, these signals being collectively designated CA in FIG. 3, and to forward the packet of request for the assignment of a new circuit channel (CRP).

To this end a buffer memory B1 of the FIFO type is provided which temporarily memorizes one or more packets (or even a part of a packet, depending on the characteristics of block PSH) it receives from block PSH through wires 5a of connection 5; subsequently, buffer B1 forwards its contents to coupler RTX through a multiplexer MX1 and a wire 3a, upon command of a control logic LC1. The multiplexer inserts into the information flow directed toward bus 1 the booking packets CRP (extracted from a suitable register included for instance in logic LC1) and inserts into packets CAR, CAI the number NCP of the channel assigned to the communication; it receives that information through logic LC1 via a logic network GS of block GSRH whose functions will be described hereinafter. Furthermore, logic LC1 receives from network GS the request TCP for sending a booking packet and supplies block CSRH with signals CPT, CATX acknowledging the transmission of such packets and of packets CAR, CAI, respectively.

For its operation, logic LC1 exchanges with block PSH through a wire 5b certain control signals (to be described hereinafter) relating to the packet transfer from block PSH to buffer B1 and exchanges information with a further logic network AA carrying out the operations relating to the bus access on the basis of signals SOF and RB, of the information on the occurrence of collisions supplied by circuit MB (signal CD, extracted for instance by comparison between data outgoing from multiplexer MX1 and the same data as present on wire 1a of the bus), and of the information on the bus activity, extracted from clock signals present on wire 1d. The latter information is here indicated in its entirety by a signal CS but will obviously include beginning-of-carrier and end-of-carrier markers.

The receiving part of the module must recognize and temporarily store the packets addressed to that interface and, among these packets, those concerning circuit-channel management and requiring at least in part a real-time processing. These particular packets are:

booking packets CRP, through which the setup of a new circuit channel in the next frame is requested; the packet reception is to be communicated to block CSRH, but the packet itself is not to be forwarded to block PSH;

packets CAR, CAI which contain the number of the channel allotted to the calling or the called party, respectively; also the reception of these packets is to be communicated to block CSRH, in conjunction with the number $\beta$ of the channel. The packets themselves are forwarded to block PSH upon replacing $\beta$ with the identity NRA of a register which in block CSRH manages the channel (information supplied by block CSRH).

To effect these operations, the receiving part of the module comprises a buffer memory B2, controlled by a logic LC2 and connected on one side (toward block PSH) to wires 5a and on the other side to wire 3b on which the received data are present.

A multiplexer-demultiplexer MX2 is interposed between memory B2 and wire 3b for extracting number $\beta$ from packets CAR, CAI and replacing it by information NRA.

Logic LC2 is connected on the one hand to block PSH (via wire multiple 5c) with which it exchanges the subsequently described control signals for the data transfer from memory B2 to block PSH and on the other hand to a circuit RIC which receives the data from wire 3b and effects the recognitions described above. As a consequence of such recognitions, circuit RIC supplies logic LC2 with signals ADR (packet addressed to the interface that circuit RIC belongs to), CA (packet CAR or CAI), CRPR (packet CRP). Signal CRPR causes logic LC2 to disable memory B2. Signals CRPR and CA are transferred from logic LC2 to the elements of block CSRH, in conjunction with signals CAOK, CANOK indicating correct or incorrect reception of packets CAR/CAI, and with number $\beta$ extracted from such packets.

Block CSRH comprises:

a bank GRE of registers managing individual channels and comprising a suitable number k of identical elements;

a logic network GS processing signals relating to registers and channels;

a logic network TR building and maintaining the hybrid frame;

a decoder GDT of timing information whose structure will be described with reference to FIG. 12.

Information exchanged between blocks CSRH and PSRH has already been discussed. Signals exchanged among constituents GS, GRE, TR, GDT will be examined with reference to the following Figures and are not indicated here in detail. The signals received from and transmitted to the bus (SOF, RB) as well as those exchanged through connection 6 with a logic network LCC belonging to block CH have, on the contrary, been individually indicated; the meaning of the latter signals will be explained in the description of the constituents of block CSRH and in the description of the operation of the system.

Indication (1/k) associated with input/output signals of register assembly GRE means that such signals are individual for each of its k registers.

Block CH comprises a bank of k buffers M1 . . . Mk with command units or controllers CLS1 . . . CLSk and a control logic LCC managing the association between the buffers and the circuit communications. Buffers M1 . . . Mk are connected on the one hand to line 8 through a multiplexer/demultiplexer MX3 and on the other hand to a switching matrix S which, upon command of logic LCC, connects a subscriber interested in a communication with an available buffer for each direction of that communication. Matrix S is also connected to a plurality of lines 9a . . . 9j on which the information flow relating to the circuit communications of a plurality of subscribers is present.

Buffers M1 . . . Mk are thus used for storing information flows either coming from or directed to bus 1, and during a communication are each associated with one of the registers in assembly GRE.

The buffers are assigned to reception or transmission by the respective controller upon instruction of logic LCC. As usual, each buffer will be divided into two parts which alternate at each frame in reading and writing operations upon command of the respective controller CLS1 . . . CLSk. Units CLS1 . . . CLSk control reading/writing in respective buffers M1 . . . Mk so that an information block capable of occupying the band requested by that channel is transmitted to the bus. The necessary information is supplied by logic LCC during the initialization phase; besides, logic LCC sends to units CLS1 . . . CLSk, when an outgoing connection is requested, the commands necessary to check the band availability on the bus and receives from these units the information on the transmission and/or check result.

The signals exchanged between circuits LCC and CLS1 . . . CLSk will be discussed in greater detail in the description of the operations; in FIG. 3 the signals exchanged between blocks LCC and PSH are expressly indicated and will be examined hereinafter. The signals concerning the transfer of information from subscriber lines to the buffers and vice versa will not be described as they are of no interest for the invention and are entirely conventional.

Figure 4:
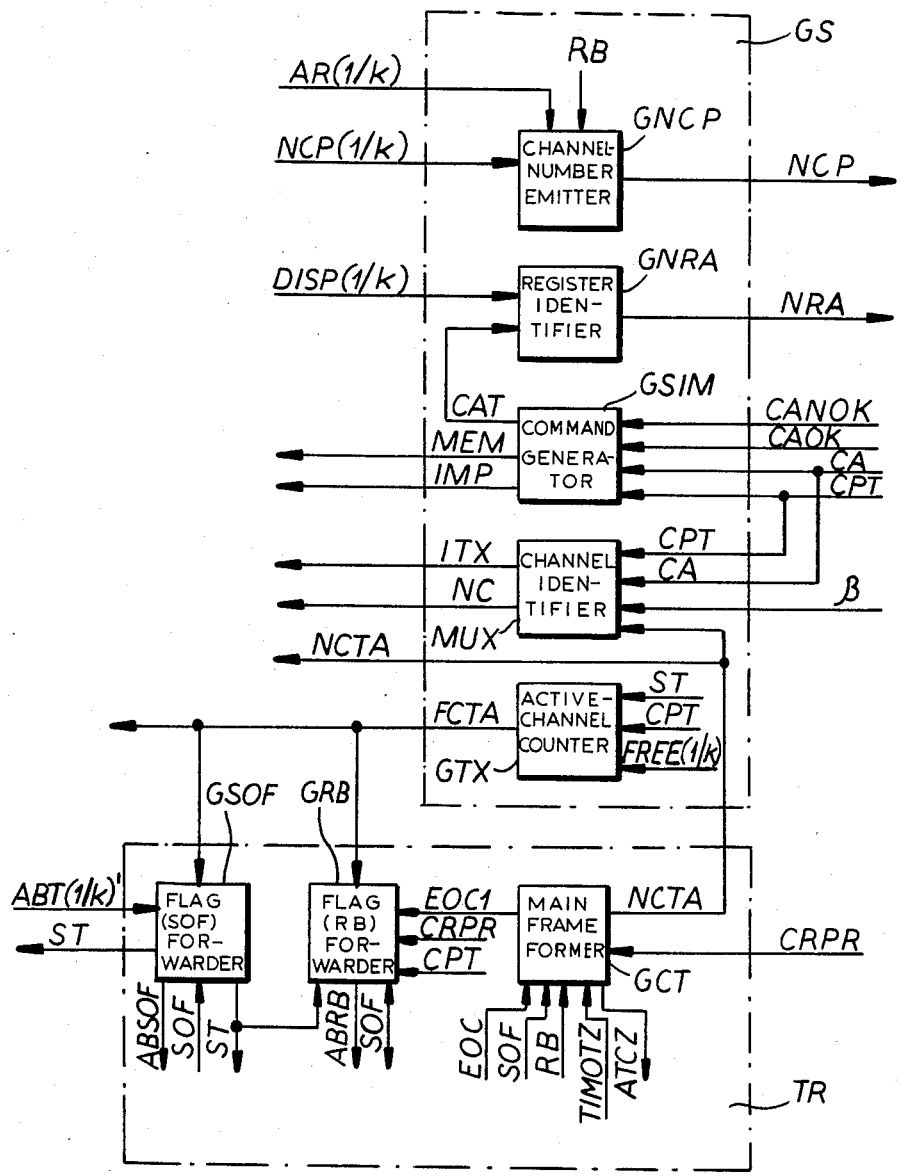
FIGS. 4 and 5 are detailed block diagrams of components of the module of FIG. 3 managing the hybrid-frame region allotted to circuit-switched communications.

FIG. 4 shows in greater detail the structure of networks TR and GS.

Frame-managing network TR is subdivided into three parts GCT, GSOF, GRB which respectively are designed to:

start the formation of the main frame and supply the number NCTA of active channels or of channels requested during a frame already established;

control the transmission of flag SOF (if such transmission is up to the module that the part GSOF belongs to);

control the transmission of flag RB.

Figure 6:
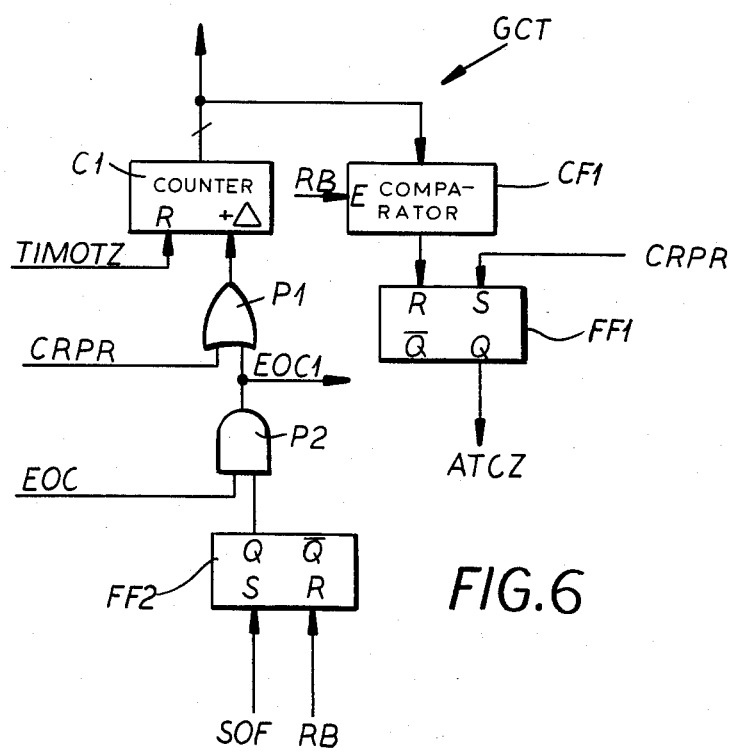
Figure 7:
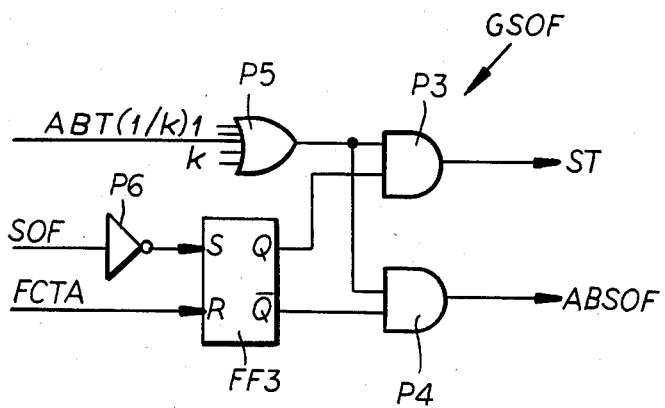
Figure 8:
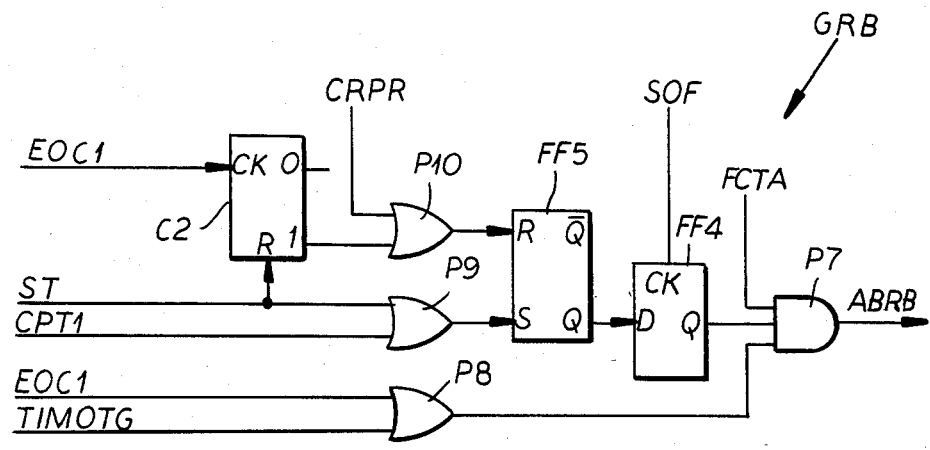

An embodiment of these parts is represented in FIGS. 6, 7, 8.

Network GS, handling the signals necessary to set up circuit channels, is subdivided in turn into five blocks GSIM, MUX, GTX, GNCP, GNRA designed respectively to:

supply the commands for the seizure of an available register of bank GRE;

supply the register involved in a communication with the number NC of the channel assigned to that communication; such number NC is either the number $\beta$ read out by logic LC2, in the case of an incoming communication, or the number NCTA available from part GCT, in the case of an outgoing communication. The commands for sending either number are signals CA, CPT already examined; signal CPT is also transferred to the register and forms a signal ITX predisposing the register for transmission;

store, frame by frame, the number of active channels in transmission which are handled by the module that block GTX belongs to (which number is obtained as a difference between the number of booked and released channels) and supply a signal FCTA enabling the transmission of the last circuit assigned to the module in that frame; such signal can be obtained as a terminal reading of a counter in which the number of active channels is set at the frame beginning and is reduced by one with each signal ST supplied by part GSOF;

render the number NCP of the channel seized for the transmission available to logic LC1 (FIG. 3). Such number is the number NC, stored in the register of bank GRE assigned to that channel, as updated to take into account the release of preceding channels; it is loaded into block GNCP upon command of a signal AR(1/k) present on an output of a register between the acknowledgement of the booking-packet transmission and the emission of packet CAR (or the release) and is emitted by block GNCP toward logic LC1 at the end of the circuit region RC;

identify the free register to be seized for transmission or reception and supply the number NRA thereof to logic LCC (FIG. 3) for transmission channels and to logic LC1 for receiving channels; the number NRA (FIG. 4) is obtained by decoding availability or unavailability signals DISP(1/k) emitted by the individual registers of bank GRE and is read out in response to a signal CAT generated by block GSIM as will be described hereinafter.

Figure 11:
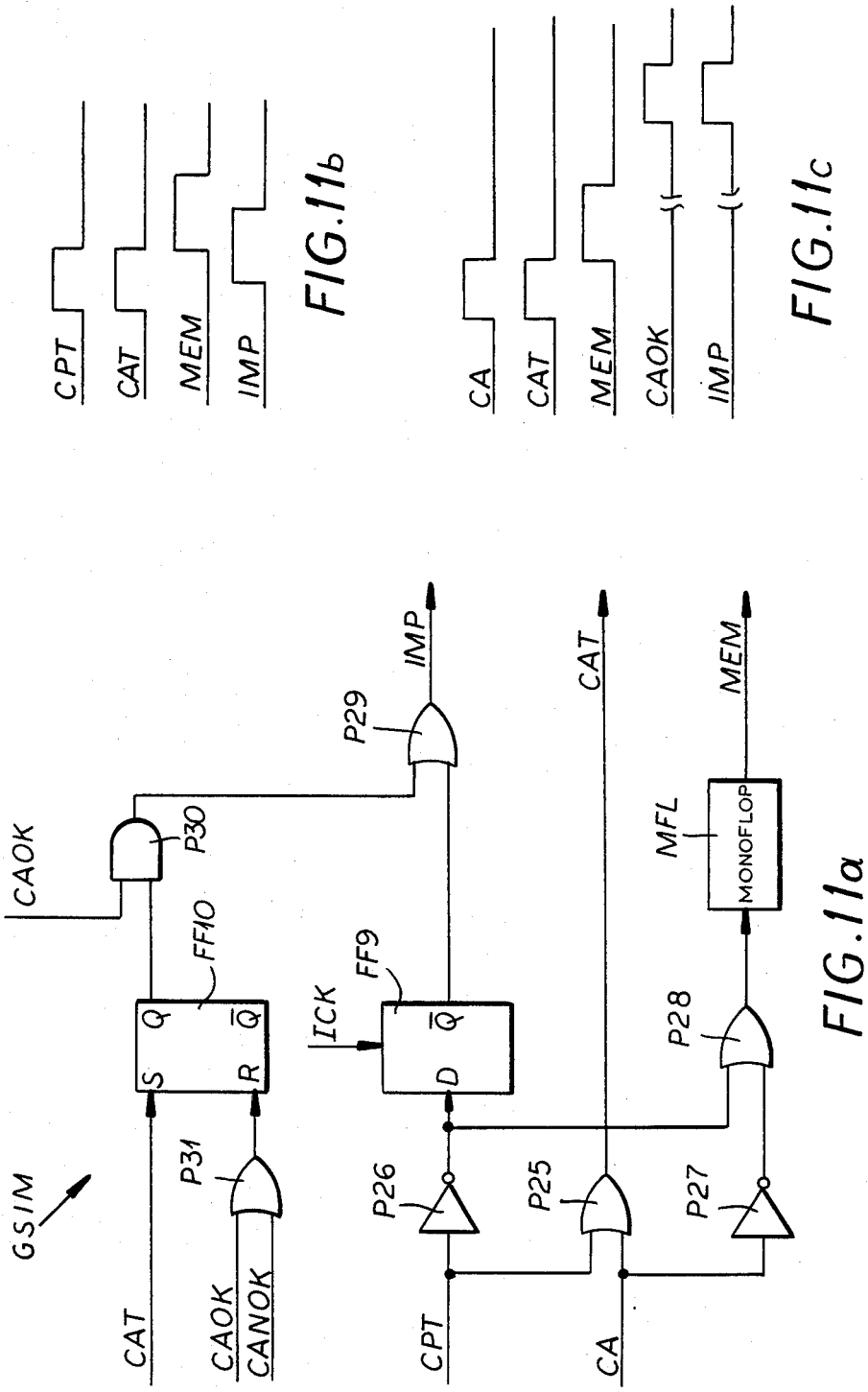

A possible embodiment of block GSIM will be described with reference to FIG. 11. The other blocks do not require any description because circuits able to carry out the operations indicated can be easily implemented by those skilled in the art.

Figure 5:
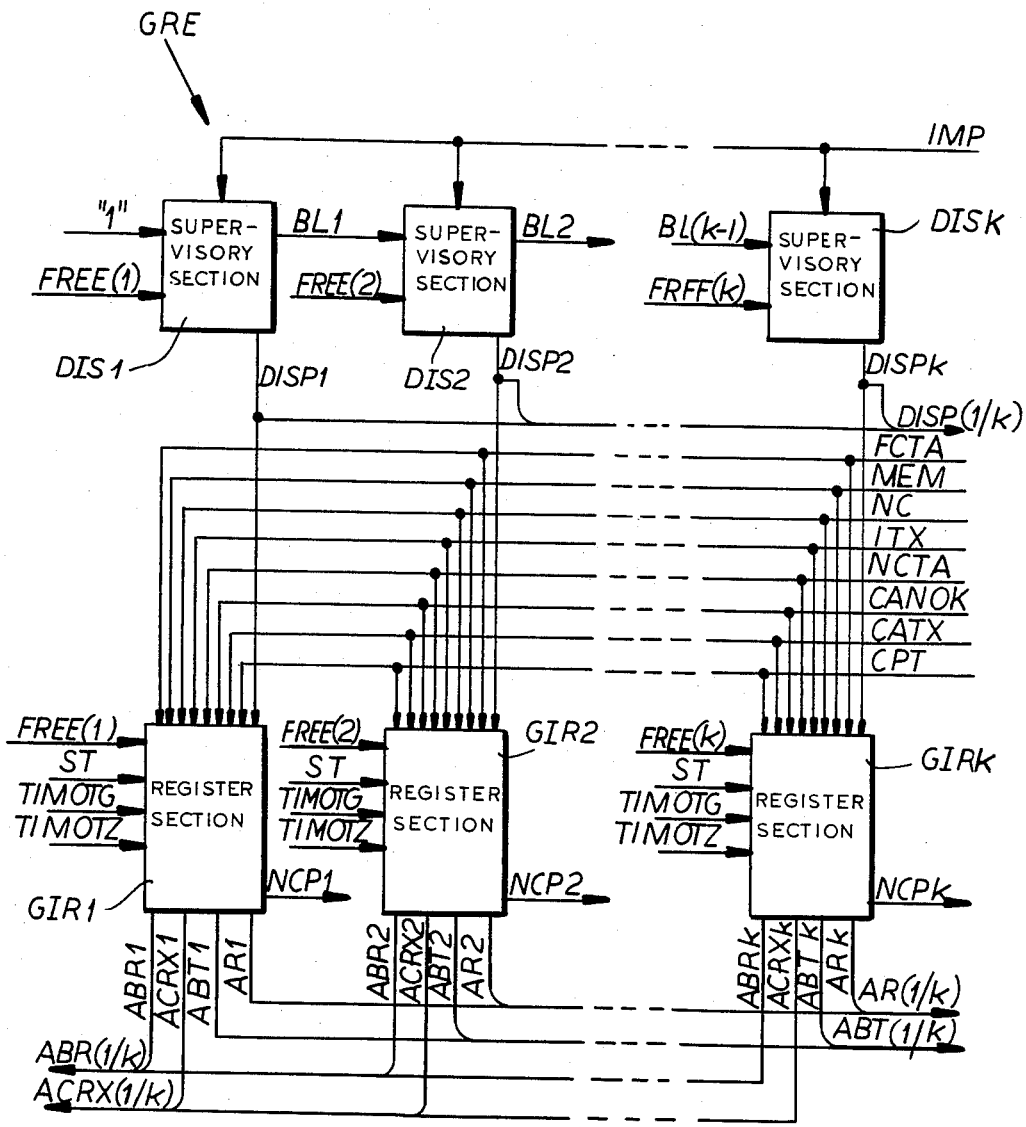

With reference to FIG. 5, each of the k elements constituting the bank of registers GRE comprises two parts: the first part consists of k supervisory sections DIS1 . . . DISk designed to signal the availability of a register (signal DISP1 . . . DISPk), i.e. the possibility of assigning such a register to a new communication; the second part consists of k register sections GIR1 . . . GIRk for the actual channel management, enabling the transmission or reception of information by block CH (FIG. 3) and storing the channel position in the frame.

As to availability, obviously only one free register need be available; besides, in order to eliminate the need to search for and choose one of several free registers, only one free register at a time is made accessible: in particular, at a given instant the free register with the lowest order number can be accessed.

Figure 9:
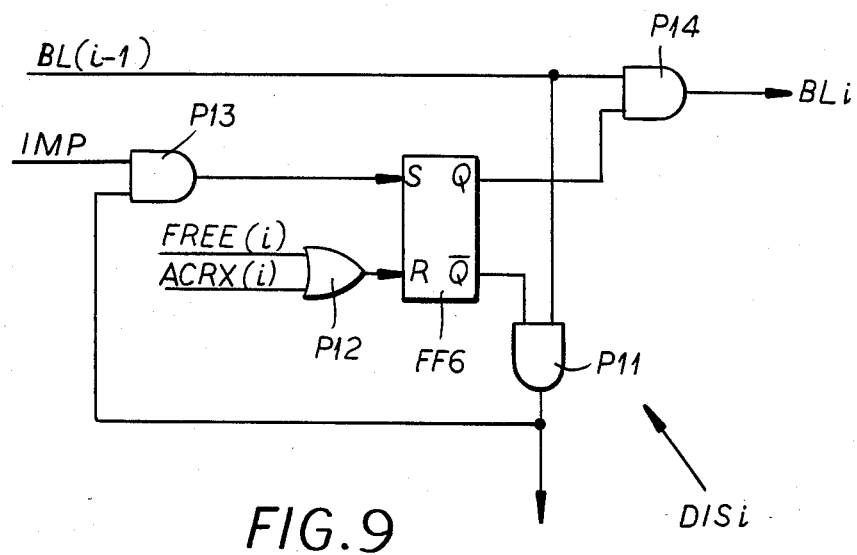

For this purpose, sections DIS1 . . . DISk are connected in cascade and one section is enabled only if the preceding section is seized or in general if no preceding section is available. Therefore each section DIS supplies the subsequent section with a busy signal BL1 ... BL(k−1) which, when it is 0, disables all subsequent registers. The way in which such busy signal and the availability signal are generated will be examined with reference to FIG. 9 showing a possible embodiment of a section DIS; the signals emitted by sections GIR of FIG. 5 will be discussed in connection with the circuit description of FIG. 10.

As shown in FIG. 6, in main-frame former GCT a first flip-flop FF1 receives signals CRPR indicating the arrival of the booking packets and generates, in response to the first of these signals, a signal ATCZ enabling decoder GDT (FIG. 3); this signal is kept present as long as there are active circuit channels as determined by a comparator CF1.

Signals CRPR are also supplied to a counter C1 through an OR gate P1 which at a second input receives signals EOC1 representing an end-of-carrier marker occurring during the circuit region RC of the frame. Such markers EOC1 are supplied to gate P1 through an AND gate P2 which receives signals EOC from the bus and is enabled through a flip-flop FF2 by signal SOF, being disabled by signal RB resetting that flip-flop. Under these conditions, component C1 counts the booking packets CRP as long as no frame has been formed, whereas in the presence of the frame it counts the active channels in the circuit region RC and again the booking packets in the packet region RP. The current count NCTA is supplied to block MUX (FIG. 4) and assembly GRE. The final value reached in a frame by count NCTA is the number NCA of channels waited for in the subsequent frame.

Advantageously, component C1 (FIG. 6) starts counting from a value (e.g. 1) different from 0, which allows the use of counting value 0 in assembly GRE to signal the free state of registers, as will be discussed hereinafter; the counter is reset at the end of each frame (signal TIMOTZ). Current count NCTA is also sent to comparator CF1 and compared, at the end of circuit region RC, with the initial count of component C1 for resetting the flip-flop FF1 when there are no longer active channels, i.e. when the frame has terminated.

As indicated in FIG. 7, flag forwarder GSOF gives passage to flag SOF only upon the occurrence of the first channel in the frame. The first channel will be obviously assigned to transmission and thus block GSOF must first receive from a section GIR of assembly GRE (FIG. 5) one of the signals ABT(1/k) indicating the enablement of a register for transmission toward the bus. Signals ABT(1/k) arrive at block GSOF through an OR gate P5. The active signal ABT is supplied to the inputs of two AND gates P3, P4 having second inputs respectively connected to outputs Q, $\overline{Q}$ of a flip-flop FF3.

Output $\overline{Q}$ is active as long as the frame is absent or, in presence of the frame, starting from the last channel handled by the module to which block GSOF belongs (signal FCTA). Therefore, for the module to which the first active channel is assigned, the occurrence of a signal ABT enables gate P4 to emit a signal ABSOF which is sent to coupler RTX and there converted into signal SOF.

Recognition of signal SOF coming from bus 1 sets the flip-flop FF3 in all the modules, through an inverter P6 if necessary.

Immediately after the set output Q of flip-flop FF3 has gone high, a signal ST is emitted through gate P3 and is supplied to components GRB and GTX (FIG. 4) to start transmission.

If, on the contrary, the frame has already been set up, the module containing the part GSOF is not to emit the flag SOF and the occurrence of a signal ABT causes, through gate P3, the instantaneous emission of start signal ST.

As illustrated in FIG. 8, flag forwarder GRB is designed to generate a signal ABRB enabling the transmission over the bus of signal RB by coupler RTX of the module handling the last channel of the circuit region. This signal ABRB is emitted at the output of an AND gate P7 at the end of the transmission of the information carried by the last channel, if a signal generated in the preceding frame is high, thereby indicating that the last channel is handled by the module associated with circuit GRB.

The condition "end of transmission of the last channel of the circuit region" is signaled by the simultaneous occurrence of a signal FCTA (generated by block GTX, FIG. 4), which enables the transmission of the last channel of the circuit region, and of signal EOC1 (end of carrier used in the transmission of that channel) or of signal TIMOTG (time Tg over). The last two signals are supplied to gate P7 through an OR gate P8; signal TIMOTG takes into account the possibility of the release of the channel during the frame, which is not to prevent the emission of signal ABRB.

The marker ABRB signifying "module handling the last channel" is stored at the frame beginning (signal SOF) by a D-type flip-flop FF4 and is generated in the preceding frame with the following criterion:

in the circuit region RC the marker goes high in response to transmission-start signal ST generated by flag forwarder GSOF (FIG. 7) and is reset when the end of the transmission of a channel relating to a different module is recognized;

in the packet region RP (or in frame absence) the marker goes or stays low at each booking packet and goes high when the packet sending is acknowledged; this acknowledgment is seen only by the module which has sent the packet.

The marker is present at output Q of a flip-flop FF5 which is set, through an OR gate P9, by signal ST or by a signal CPT1 (this being the signal CPT delayed so as to arrive after the acknowledgment of a booking packet); flip-flop FF5 is reset, through an OR gate P10, by signal CRPR or by the terminal count of a modulo-2 counter C2, which is stepped by signals EOC1 coming from main-frame former GCT (FIG. 6) and is zeroized by start signal ST.

It is easy to verify that this circuit arrangement implements the described procedure. More particularly, as far as the circuit region RC is concerned, it is to be noted that signals EOC1 have no effect on the transmitting module since its counter C2 is reset each time by signal ST.

For reasons already noted, sections DIS of the assembly GRE co-operate to make only one free register at a time available and to disable all the subsequent registers. A generic section DISi shown in FIG. 9 can signal its availability provided it is free (absence of seizure signal IMP) and no section DIS with lower order number is available, i.e. if the incoming busy signal BL(i−1) is at logical 1. For this purpose signal BL(i−1) is supplied to an AND gate P11 which emits signal DISPi when reset output $\overline{Q}$ of a flip-flop FF6 is high. That flip-flop is set through an AND gate P13 by seizure signal IMP emitted by command generator GSIM (FIG. 4) and is reset, through an OR gate P12, by signals FREE(i) or ACRX(i), emitted by circuits CH (FIG. 3) and GIRi (FIG. 5), respectively, when the register release is requested. Moreover, output $\overline{Q}$ of flip-flop FF6 is active from the beginning of the operation of the apparatus until the reception of signal IMP. AND gate P13 is enabled by signal DISPi. The set output Q of flip-flop FF6 is connected to an input of an AND gate P14 which receives at a second input the incoming busy signal BL(i−1) and emits the outgoing busy signal BLi. Therefore, signal DISPi is emitted if not even one of the preceding registers is available [BL(i−1)=1] and if the register itself is not seized; under these conditions, signal BLi sent to the (i+1)$^{th}$ register is 0, so that the latter register is disabled and disables all the subsequent registers.

Seizure signal IMP, which is sent to all registers, can in turn be processed only by the available register.

Figure 10:
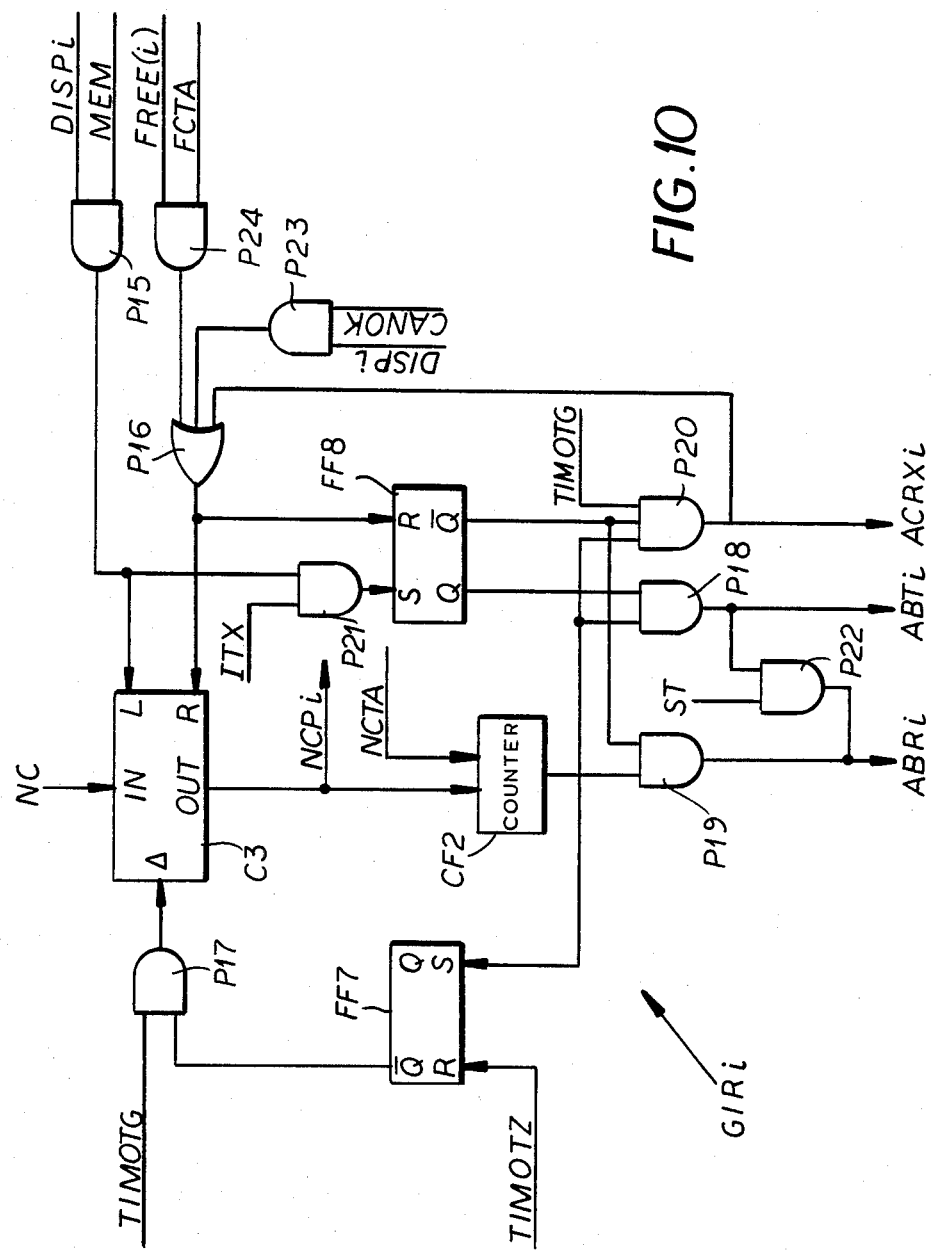

FIG. 10 shows the layout of section GIRi supervising the i$^{th}$ register, under the assumption that such register is the one available.

A counter C3 loads the channel number NC, supplied by channel identifier MUX (FIG. 4), when block GSIM emits a signal MEM in the manner to be examined hereinafter. The loading command is transmitted to counter C3 through an AND gate P15, which receives signals DISPi and MEM. Counter C3 is reset through an OR gate P16, when the conditions described hereinafter occur, and is decremented by the output signal of an AND gate P17 which receives at one input the signal TIMOTG and has another input connected to the complementary output $\overline{Q}$ of a flip-flop FF7, reset by signal TIMOTZ.

The updated count is presented at the output of counter C3 as booked-channel number NCP and is supplied also to a comparator CF2 which compares it with the current channel number NCTA generated by frame former GCT (FIGS. 4 and 6).

The output of comparator CF2 is connected to the setting input of flip-flop FF7 as well as to inputs of three AND gates P18, P19, P20. Since such an output passes to "1" only when NCTA becomes equal to NCPi, the connection with flip-flop FF7 allows the value stored in counter C3 to be decremented during the frame only when NCTA is less than NCPi, i.e. only if a channel preceding the one booked for that register has been released; in this case, as already mentioned, the frame is to be compacted again.

The three gates P18, P19, P20 are enabled when comparator CF2 signals the equality between NCTA and NCP (i.e. when the booked channel occurs). Gate P18 then emits signal ABTi toward flag forwarder GSOF (FIG. 7), provided that output Q of a flip-flop FF8 (FIG. 10) is high; this indicates that the register is used for transmission, as that output goes high upon the occurrence of signal ITX emitted by block MUX (FIG. 4) and fed to the setting input of flip-flop FF8 (FIG. 10) through an AND gate P21 which is enabled by the output signal of gate P15.

Gate P19 emits a signal ABRi toward logic LCC (FIG. 3) where that signal will be converted into an enabling signal for the buffer assembly M1 . . . Mk associated with the i$^{th}$ register. Such signal is emitted as soon as the booked channel occurs, if the register is seized for reception (i.e. if output $\overline{Q}$ of flip-flop FF8 is active) or, if the register has been seized for transmission, after the emission of start signal ST by circuit GSOF (FIG. 7). In the latter case signal ABRi is present at the output of an AND gate P22, which receives at one input the signal ST and has another input connected to the output of gate P18.

Finally, gate P20 emits a signal ACRXi (release of a channel) toward logic LCC (FIG. 3) when the channel is seized for reception and the guard time relating to the channel itself is over (signal TIMOTG).

Signal ACRXi also goes to an input of OR gate P16 (FIG. 10) which can reset elements C3 and FF8 also when the transmission of packet CAR or CAI is not successful (signal CANOK supplied to gate P16 through an AND gate P23 which receives at a second input the signal DISPi) or when logic LCC requests release by signal FREE(i). In the latter case the initial conditions are resumed on occurrence of the last channel handled by the module, as indicated by an AND gate P24 which receives signals FREE(i) and FCTA.

Block GIRi is also associated with circuits generating signal ARi as already described; these circuits are not shown since their implementation presents no problem to the skilled in the art.

As seen in FIG. 11a, block GSIM generates the three signals CAT, MEM and IMP for register identifier GNRA, register sections GIR and supervisory sections DIS, respectively (cf. FIG. 4).

Signal CAT indicates the setup of a transmitting or receiving channel and issues from an OR gate P25 which receives signals CPT and CA.

Signal MEM causes the loading into the register of the number NCTA or β of the channel used for transmission or reception, respectively; this signal is to follow the emission of signal CAT and thus its leading edge can be generated, in response to the trailing edges of signal CPT or CA, with the aid of inverters P26, P27 working into an OR gate P28 whose output pulse triggers a monoflop MFL on its rising edge.

Signal IMP, which causes the definitive seizure of the register, is present at the output of an OR gate P29. In transmission, signal IMP is represented by signal CPT, inverted in element P26 and stored in a data flip-flop FF9 whose output $\overline{Q}$ is read out by an internal clock signal ICK; during reception, signal IMP is transmitted upon the acknowledgment of the successful transmission of packets CAR/CAI and is obtained from signal CAT, which is supplied to gate P29 through a set/reset flip-flop FF10 and an AND gate P30 enabled by signal CAOK. Flip-flop FF10, set by signal CAT, is then reset upon termination of packet CAR/CAI, independently of the transmission result. This is achieved by an OR gate P31 which has its output connected to the resetting input of flip-flop FF10 and receives at its inputs the "OK" and "Not OK" signals CAOK, CANOK.

Signals CAT, MEM, IMP are shown in graphs of FIGS. 11b and 11c for transmission and reception, respectively.

Figure 12:
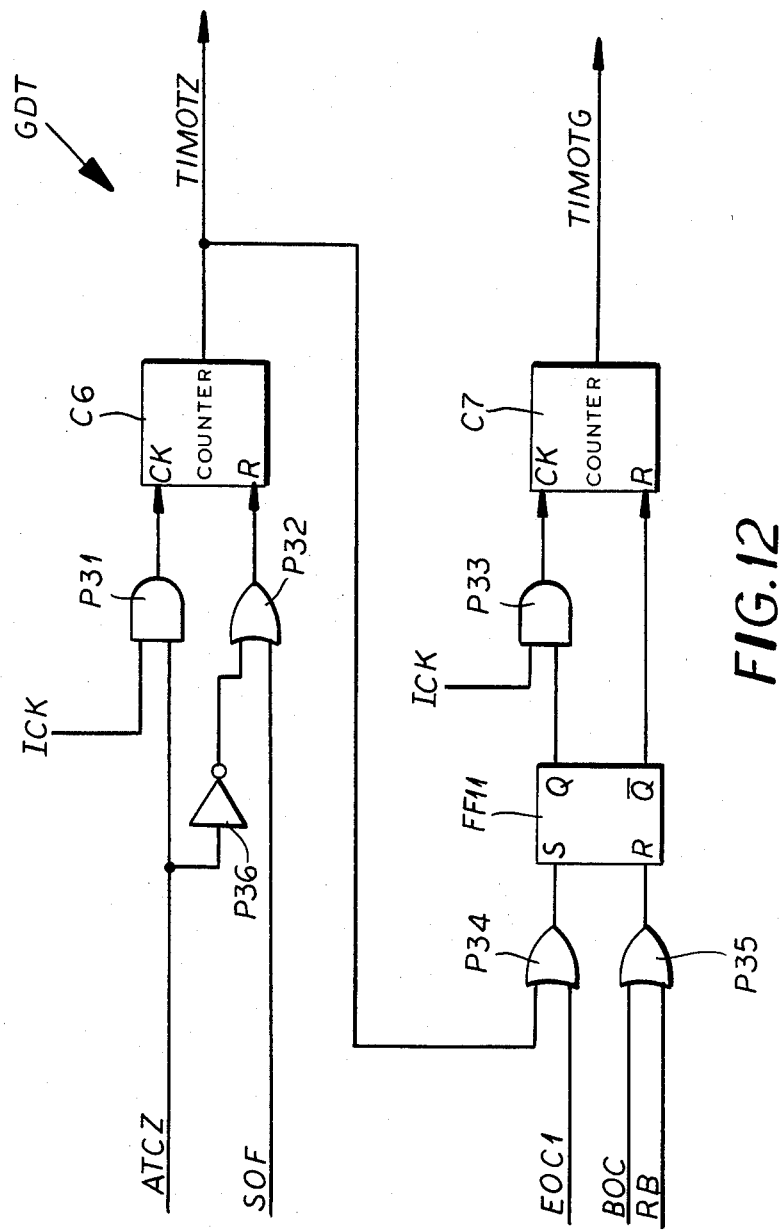

Decoder GDT, shown in FIG. 12, sends signals TIMOTZ and TIMOTG to the circuits of block CSRH to mark the end of time Z (frame duration) and of guard time Tg; decoder GDT is resynchronized at each frame in order to take into account the possible release of the first channel or channels.

The decoder circuit basically consists of two counters C6, C7 which emit signals TIMOTZ, TIMOTG when they have counted a predetermined number of internal clock pulses ICK. Counter C6 is kept at zero through an inverter P36 and an OR gate P32 up to the beginning of the formation of the hybrid frame on the bus, i.e. until the emission of signal ATCZ by frame former GCT (FIG. 6); when such signal arrives, component C6 counts the pulses ICK which it receives through an AND gate P31. Once the frame is formed, counter C6 is reset at each new frame by signal SOF, supplied through a second input of gate P32. In this way, frame duration Z is computed every time when the startup of the frame is actually detected.

Counter C7 starts counting the pulses ICK, either after time Z is over (for the first channel of the frame) or after the occurrence of signal EOC1 (i.e. upon recognition of the end-of-carrier markers relating to the channels of the circuit region), and stops counting when a beginning-of-carrier marker BOC or the regional marker RB is recognized. To this end, pulses ICK are supplied to counter C7 through an AND gate P33 enabled by the signal present at the set output Q of a flip-flop FF11 which has it reset output Q connected to the zeroizing input of counter C7 and which is set, through an OR gate P34, by signal TIMOTZ or EOC1, being resettable through an OR gate P35 by marker BOC or RB.

We shall now explain the operation of the apparatus for the handling of circuit-switched communications. The operation for packet-switched communications is quite conventional, once the bus-access protocol has been determined. However, as the signalization of circuit-switched communications takes place in packet form, some packet processing will also become apparent from the following description. To make the description clearer, the operations carried out by blocks PSH, CH, PSRH, which are represented by flow charts, will be separately described. The operations of block CSRH will only be summarized since the functions of its individual components have already been described in detail.

(1) Packet-Flow Controller PSH

Figure 13:
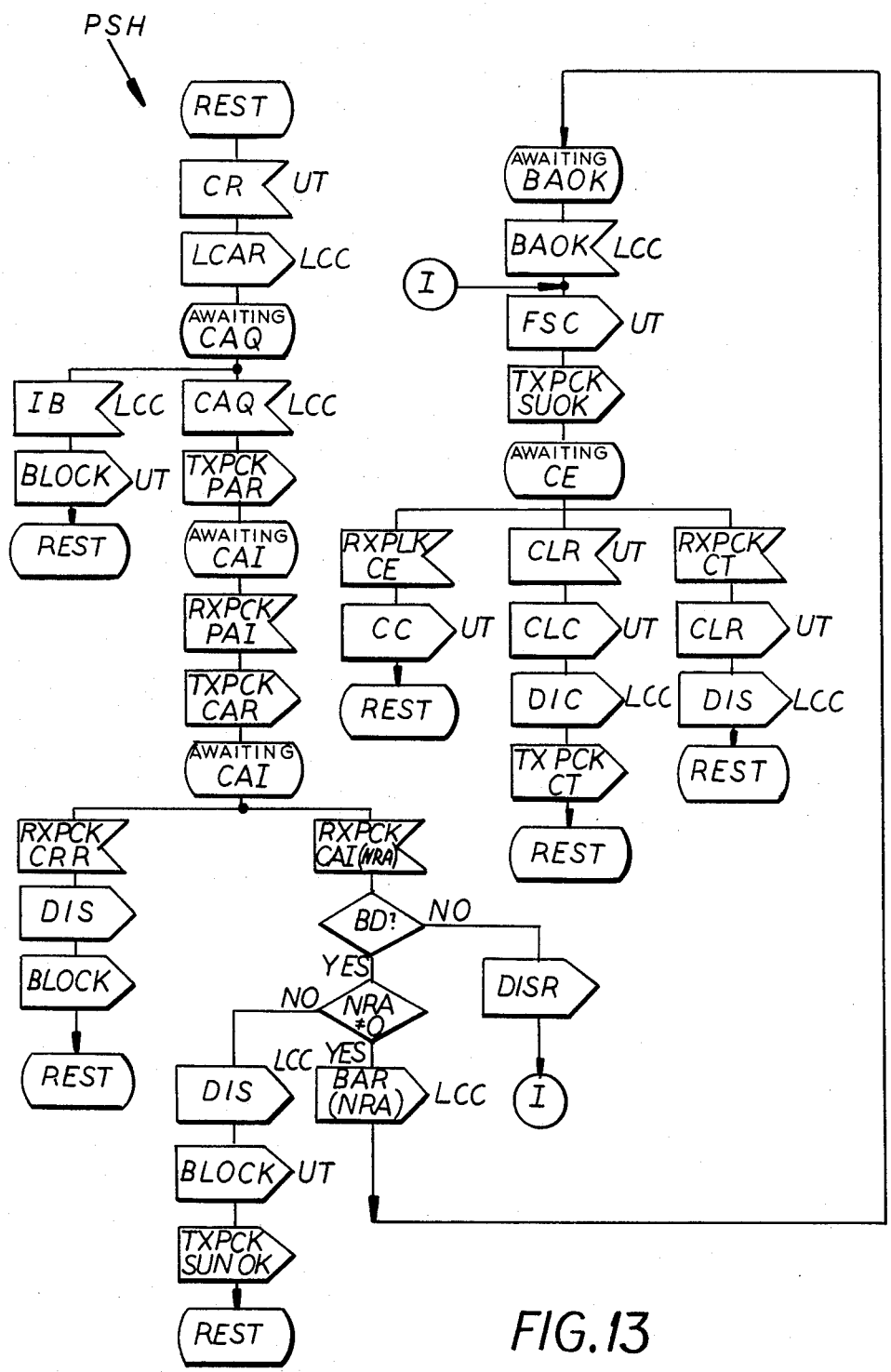
FIGS. 13-20 are flow charts of the operations of some of the logic networks in the node.
Figure 14:
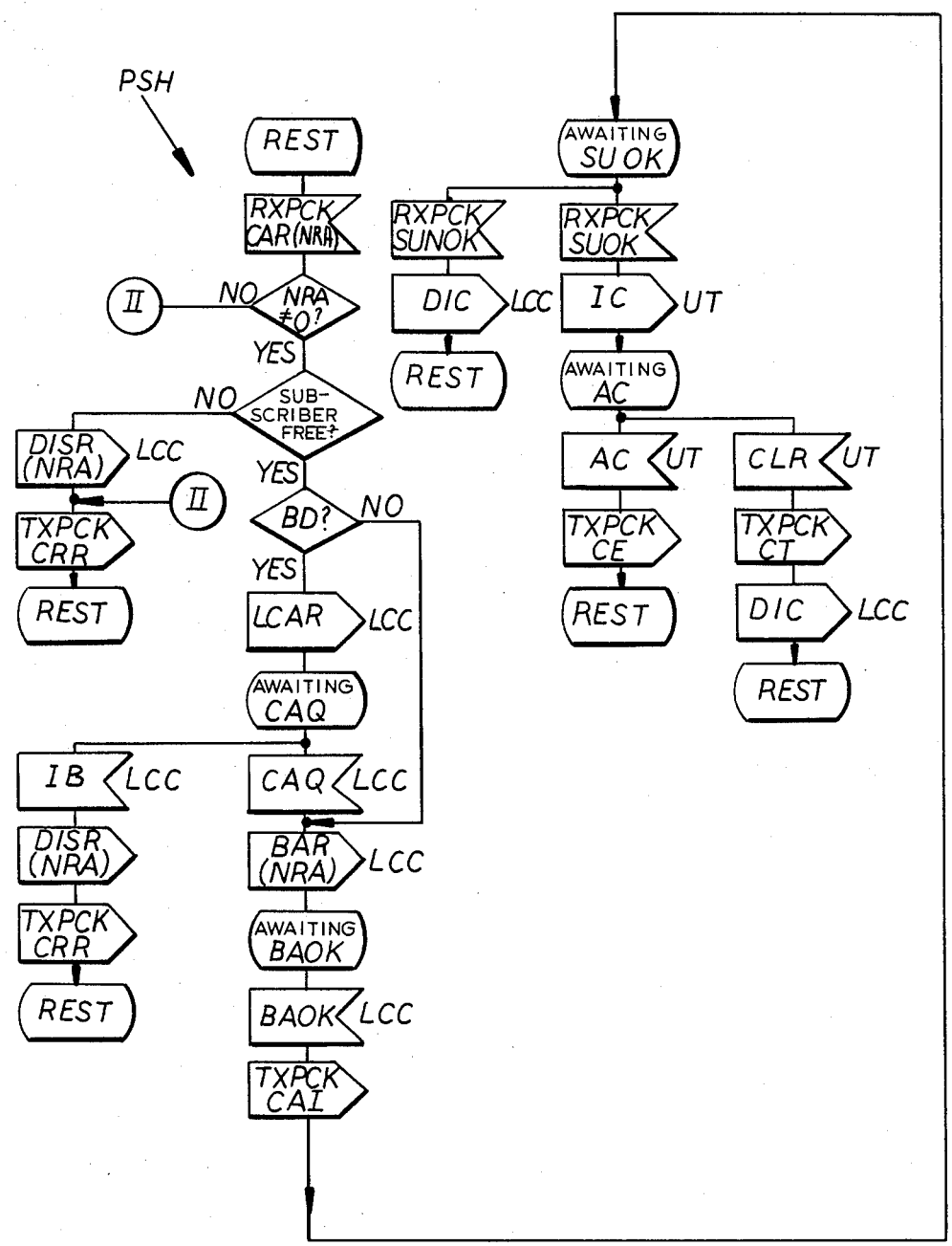
Figure 15:
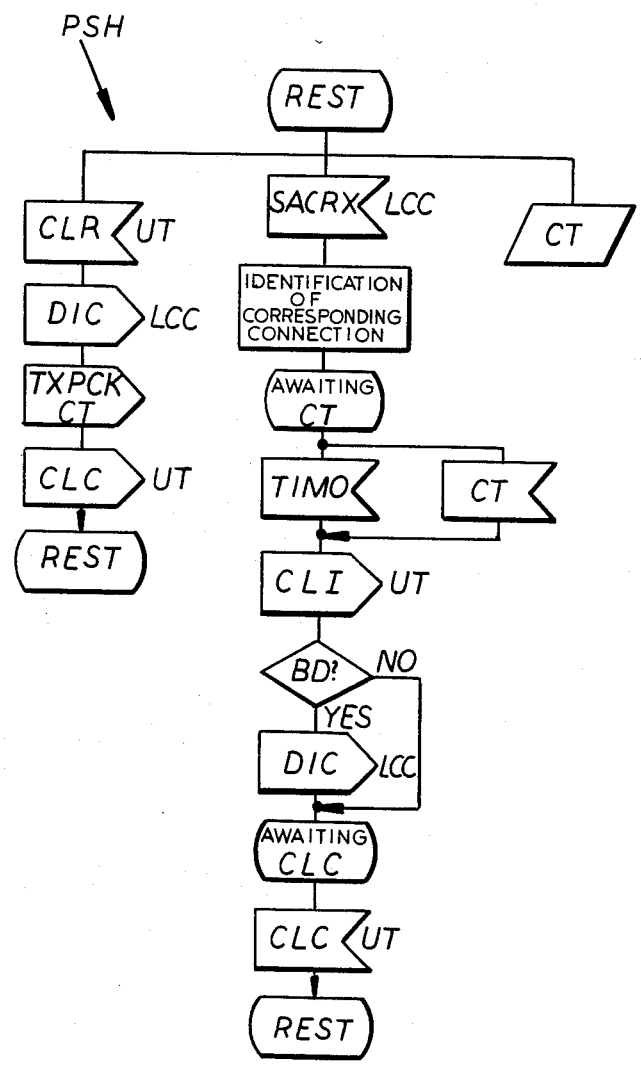

The operations carried out by block PSH are represented in FIGS. 13, 14 for the setup of the connections relating to an outgoing or an incoming call, respectively, and in FIG. 15 for the release thereof.

In the case of an outgoing call, block PSH is activated by a request CR sent by a subscriber UT; upon receipt of such a request, block PSH sends to logic LCC in block CH (FIG. 3) a request LCAR for channel acquisition, together with the information on the band length necessary for the communication. Logic LCC (FIG. 3) checks the possibility of setting up the channel with the requested characteristics, as will be described hereinafter. As a result of the operations carried out by logic LCC, block PSH receives an inhibition signal IB if the channel is not available, or the acknowledgment CAQ of channel acquisition.

In case of an inhibition, the situation is communicated to the subscriber (signal BLOCK) and controller PSH returns to its rest condition. If the channel is available, block PSH transmits a packet PAR (TXPCK PAR) through block PSRH to nodal module MN (FIG. 1) to request the information necessary to reach the called subscriber. Once that information has arrived through a packet PAI (RXPCK PAI), block PSH commands block PSRH to transmit a packet CAR (TXPCK CAR) in order to inform the called subscriber station that it is to set up a receiving channel, and waits for packet CAI by which the called station reports that it accepts the call; the latter packet includes the number NRA of a tentatively selected register of circuit-access block CSRH temporarily assigned in the interface to receiving operations.

In case the called station has not accepted the call, it sends a packet CRR to block PSH (RXPCK CRR) to signal the impossibility of establishing a connection. This fact is communicated to logic LCC through a signal DIC, by which the release of the temporarily seized channel is requested, and to the calling subscriber by the signal BLOCK; subsequently, block PSH returns to rest. If the called station has accepted the call, block PSH—on receiving packet CAI—checks in an inquiry (BD?) whether the communication is bidirectional. In the affirmative case, block PSH checks in a further inquiry whether number NRA is different from zero. If NRA=0 (i.e. if no register is available at the module associated with the called subscriber), block PSH operates as in the case of a refused call; moreover, it causes a packet to be sent to the called subscriber to signal the impossibility of establishing the connection (TXPCK SUNOK).

If number NRA is different from 0, block PSH instructs logic LCC through a signal BAR(NRA) to seize the buffer M1 . . . Mk (FIG. 3) corresponding to the register indicated by number NRA and waits for the acknowledgment BAOK (FIG. 13). When signal BAOK arrives, block PSH reports the establishment of the connection to both the calling and the called subscriber (signals FSC and TXPCK SUOK). The operations relevant to both the check of the availability of a register for the reception (NRA≠0) and the sending of signal BAR are obviously unnecessary if the communication is not bidirectional; in this case block PSH causes the release of the register temporarily seized (signal DISR) and then sends out a signal FSC and a packet SUOK. Block PSH then waits for an acknowledgment CE from the called party.

If packet CE arrives, the calling subscriber is informed by a signal CC and the procedure for establishing the connection is over. Instead of packet CE, a release request (CLR or RXPCK CT) can arrive from the calling or the called party, respectively.

In the first case the receipt of the release request is acknowledged to the calling party (CLC), the release of the seized components is requested (DIC), the called party is informed of the end of communication (TXPCK CT) and the rest condition is re-entered. In the second case, the release is reported to the calling party (CLR) and signal DIC is sent to logic LCC, whereafter the rest condition is resumed.

As to the incoming call (FIG. 14), block PSH of the called party is activated when it receives packet CAR containing the number NRA of an available register, if any, which is temporarily seized. If the called party has no registers available for the communication (NRA=0), the already-defined rejection packet CRR is transmitted (TXPCK CRR) to the calling party whereupon the state of rest is re-entered.

In the presence of available channels, flow controller PSH checks whether the subscriber station is free; in the negative case it asks through logic LCC for the release of the register, through a signal DISR (NRA), and sends packet CRR as before. If on the contrary the station is free and the communication is bidirectional, signal LCAR is sent to logic LCC and the inhibition signal IB or the channel-acquisition acknowledgment CAQ is awaited as a reply (AWAITING CAQ).

In the event of an inhibition, the same operations are repeated as are carried out in the case of a busy subscriber. If a possibility exists to establish a channel toward the calling party (or, in the case of a unidirectional communication, as soon as the subscriber is found to be free), block PSH sends the signal BAR(NRA) to logic LCC in order to open the reception channel and, upon receiving the signal BAOK confirming that event, transmits the packet CAI with identification of the opened channel. It then goes to a waiting state ("AWAITING SUOK") in expectation of a signal from the calling party confirming that the communication has been established. When that confirmation SUOK arrives (RXPCK SUOK), block PSH advises the involved subscriber (signal IC) that a call is in existence and awaits that subscriber's acceptance signal AC. Upon such acceptance, block PSH forwards to the calling party the acknowledgment packet CE (TXPCK CE) before entering the quiescent state; if, on the other hand, a disconnect signal CLR arrives instead of the acceptance signal AC, block PSH sends to the calling party the packet CT (TXPCK CT) and to logic LCC the disconnect request DIC. This disconnect request is also emitted when the calling party signals (RXPCK SUNOK) the impossibility of establishing the communication, as where the remote subscriber has hung up.

As to the release (FIG. 15) there are no differences between calling and called subscriber; each station releases its transmitting channel, while for the receiving channel the release is automatically initiated because information carried by the channel does not arrive within time Tg.

To release the transmission channel, block PSH receives from the subscriber the release instruction CLR which is handled as already described in connection with FIG. 14; in addition, the release is acknowledged to the subscriber station by a signal CLC.

The release of the receiving channel is handled by units CSRH and LCC as will be described hereinafter. Block PSH is informed by logic LCC through a signal SACRX; as soon as the connection to which the release request refers has been identified, information CT (compare FIG. 13) is awaited and, when it arrives or after a predetermined waiting time (TIMO), the subscriber is informed of the release (CLI).

If the channel is bidirectional, logic LCC is requested to release the components seized for the transmission (DIC); when the subscriber acknowledges the release (CLC), the rest condition is regained. If the channel is monodirectional, a release of the transmitting channel is obviously unnecessary.

(2) Logic LCC

Figure 16:
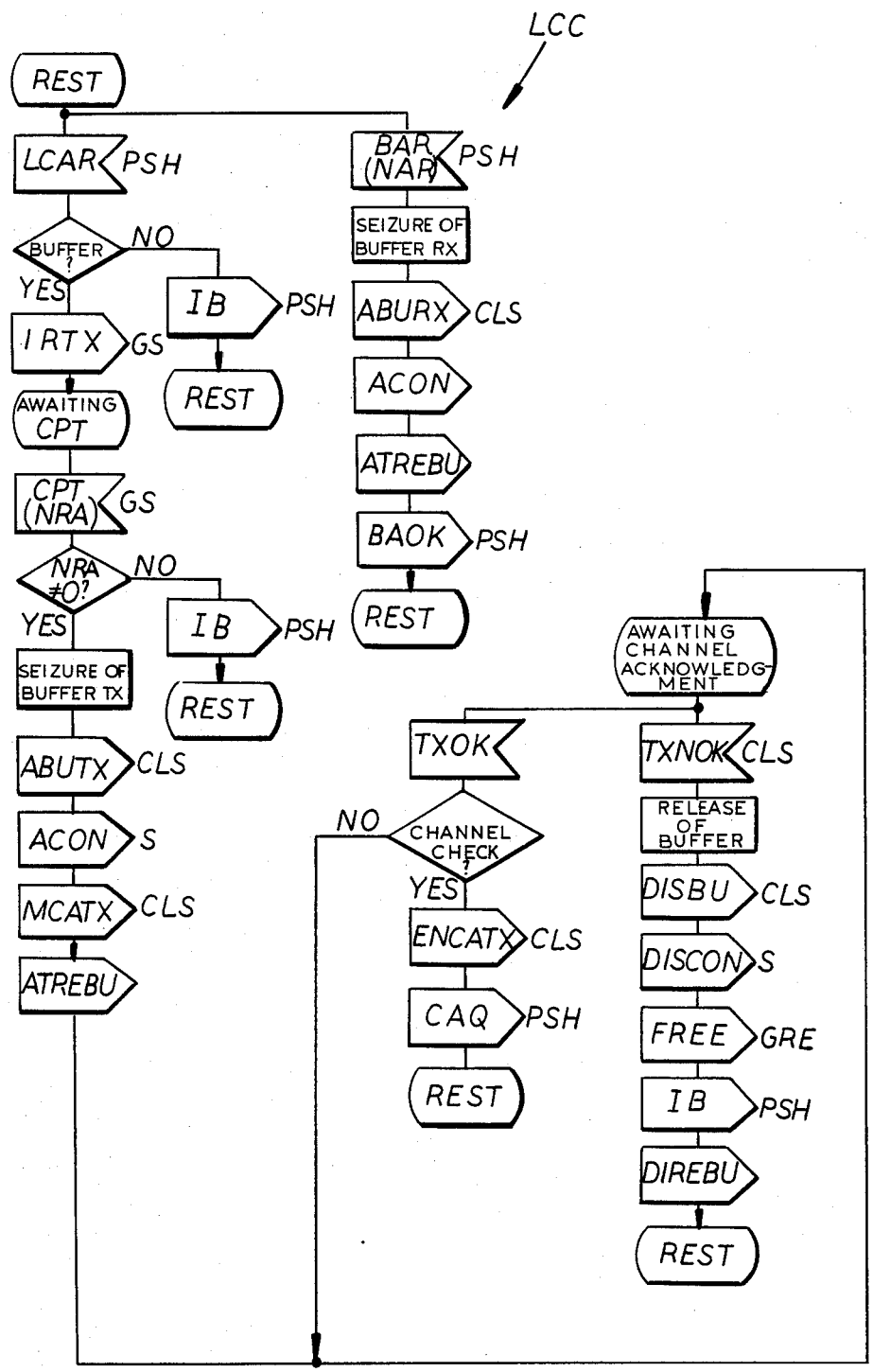

As to activation of circuit channels, reference is made to FIG. 16.

Logic LCC in circuit-flow controller CH is requested to intervene by block PSH through signal LCAR in case of transmission or BAR(NRA) in case of reception.

Considering first the transmission, logic LCC checks whether buffers are available (inquiry Buffer?). In the negative case it sends to block PSH the inhibition signal IB (FIG. 14), returning to the rest condition; in the affirmative case it supplies network GS with signal IRTX to make block CSRH request the transmission of the booking packet, whereupon logic LCC awaits from network GS the acknowledgment CPT(NRA) of the transmission of such a packet together with the number NRA of the available register. If no register is available (NRA=0), inhibition signal IB is sent to block PSH.

If there are registers available in bank GRE (NRA≠0), logic LCC seizes the corresponding buffer for transmission (ABUTX), predisposing the length of the information block required by the outgoing communication; connects the buffer with the subscriber line (ACON) through matrix S (FIG. 3); enables the controller CLS of the seized buffer to check the band availability on the bus (signal MCATX); and connects the buffer with the register (ATREBU). Afterwards, logic LCC waits for the reception of the check result from controller CLS (AWAITING CHANNEL ACKNOWLEDGMENT).

The result is taken as favorable if the information block of the required length could have been transmitted in two successive frames; this is necessary, when the band assigned to a channel varies from frame to frame, in order to take into account any fluctuations of the available band on the bus due to transient phenomena resulting from the release of initial frame channels. Of course, if the band is fixed, the availability test can be effected in a single frame.

When the information block has been transmitted (TXOK) and the test is over, logic LCC supplies controller CLS with end-of-test signal ENCATX and confirms the availability to block PSH with signal CAQ; if after the signal TXOK the test is not yet finished, the result is awaited as before.

If no band is available on the bus (TXNOK), logic LCC releases the buffer by sending signal DISBU to controller CLS, causes disconnection of the buffer from the subscriber line (DISCON) and from the bank register (DIREBU), sends signal FREE to assembly GRE to release the register previously seized, and signals to block PSH the inhibition (IB), returning then to the quiescent state or rest condition.

To set up a receiving channel, logic LCC, on detecting the signal BAR from block PSH, seizes the buffer for reception (ABURX), associates the buffer with the subscriber and the register (ACON, ATREBU) and acknowledges the setup to block PSH (BAOK), returning then to the resting state.

Figure 17:
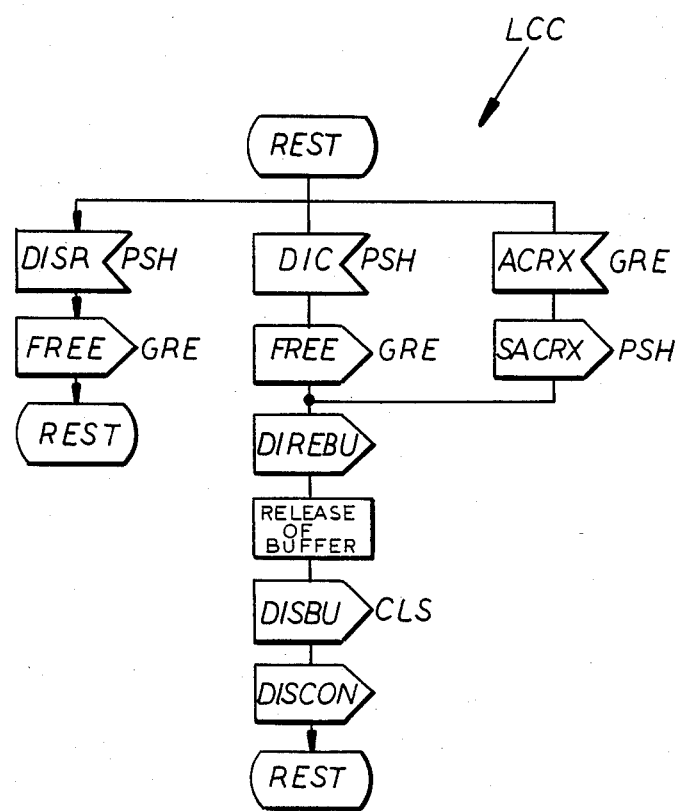

Release (FIG. 17) can be controlled either by signals DISR, DIC, coming from block PSH, or by a request for the release of a reception channel (ACRX) coming from assembly GRE.

The conditions which cause the emission of signals DISR and DIC have already been examined in the review of the preceding flow charts.

The arrival of signal DISR causes only the emission of signal FREE toward the register temporarily seized and the return of logic LCC to rest. The arrival of signals DIC and ACRX starts basically the same operations as discussed above in the context of unavailability during the setup, except for the emission of the inhibition signal IB; besides, in case the release is requested by assembly GRE (signal ACRX), signal SACRX is emitted toward block PSH instead of signal FREE.

(3) Logic AA

Figure 18:
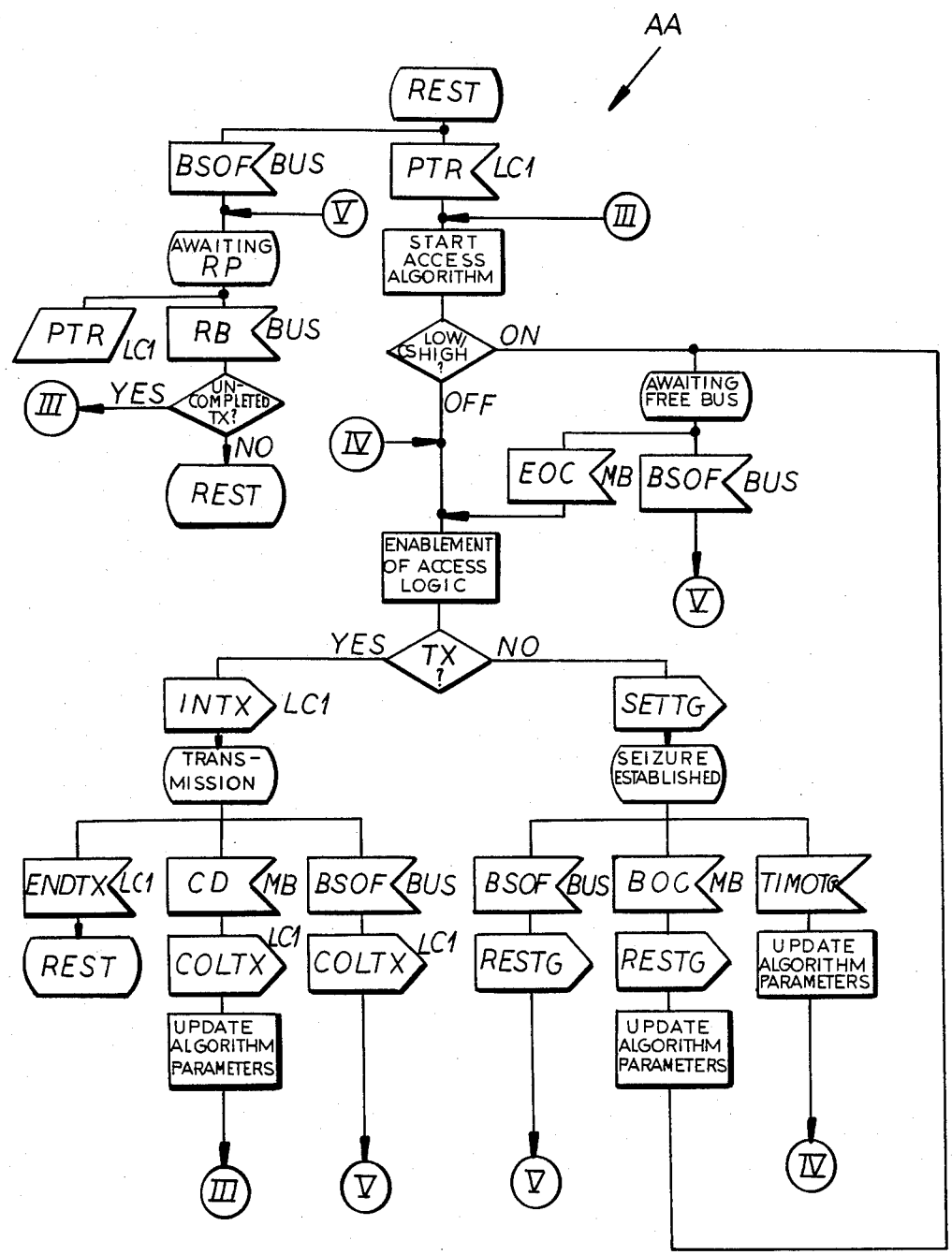

Reference is now made to FIG. 18, which for reasons of general applicability depicts the operations carried out by logic AA when the frame is already formed; such operations are the same for both data packets and signalization packets pertaining to circuit communications.

Logic AA is designed to attempt the access to the bus only in the packet region RP of a frame and to interrupt the activity as soon as the circuit region RC of the next frame begins. To this end, the logic AA detects the beginning BSOF of signal SOF which, as mentioned, has such a duration that it allows packet-activity interruption without collision with the channels in the circuit region.

Therefore, upon the arrival of signal BSOF, logic AA must wait for the beginning of the packet region (AWAITING RP) signaled by flag RB; possible access requests (PTR), sent by logic LC1 and occurring before flag RB, are handled only after that flag has arrived. Once the packet region is begun, logic AA checks in an inquiry "UNCOMPLETED TX?" whether any transmission has been left unfinished in the preceding frame; in the negative case it returns to rest, waiting for access requests PTR, whereas in the affirmative case it begins to check the transmission possibility on the bus by using the same parameters of the access algorithm that were used for the interrupted transmission.

With the arrival of new packet-transmission requests, logic AA initializes the algorithm parameters and checks the transmission possibility. For this purpose it must first find out whether the bus is free (CS LOW/-HIGH?). If signal CS supplied by bus monitor MB (FIG. 1) indicates that the bus is free (OFF), the protocol-managing access logic (not illustrated separately) is enabled. If the bus is busy (ON), logic AA waits for a free interval (AWAITING FREE BUS) and when this occurs (signal EOC supplied by unit MB and indicating the end of carrier), it enables the access logic; while logic AA is waiting, the packet region RP can obviously terminate (BSOF), in which case there is a recurrence of the operations described for the case in which signal BSOF precedes the bus-access request PTR.

The access logic of unit AA is to decide whether or not to try the transmission on the basis of the chosen protocol (inquiry TX?). If it decides to try the transmission, logic AA communicates the decision to logic LC1 through signal INTX, which makes logic LC1 command the packet transmission, and waits for the transmission outcome.

In case of successful transmission (signal ENDTX supplied by logic LC1), logic AA regains the rest condition while waiting for the next request; in case of an unfavorable result due to collision (signal CD supplied by unit MB), it signals itself the collision to logic LC1 (COLTX), updates the algorithm parameters and repeats the operations described, starting from the check on the transmission possibility.

Obviously the transmission may be aborted by the arrival of signal BSOF; also in this case the event is signaled to logic LC1 by signal COLTX and the new packet region RP is awaited.

If, on the contrary, the access logic decides not to attempt the transmission, a guard time equal to Tg (SETTG) is started during which:
the circuit region (BSOF) can begin, thereby stopping the count of interval Tg (RESTG) while waiting for the packet region;
signal BOC can occur to indicate bus occupation; also in this case the counting of interval Tg is stopped and, after updating the algorithm parameters, a free interval is again awaited.

If, on the other hand, time Tg elapses (TIMOTG), the algorithm parameters are updated and the operations are resumed, starting from the enablement of the access logic.

(4) Logic LC1

Figure 19:
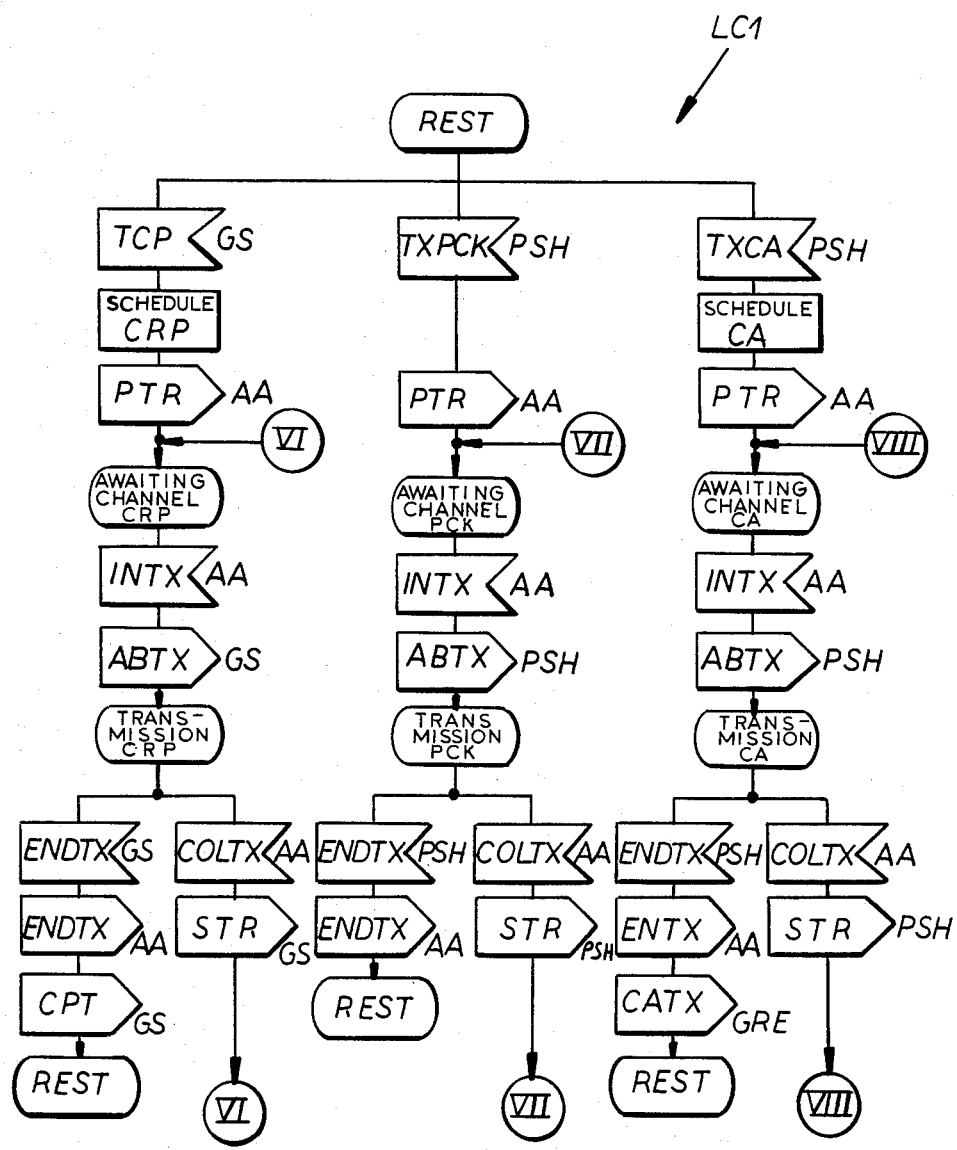

Logic LC1 manages the operations relating to the actual packet transmission with the modalities shown in FIG. 19. Three cases are possible:

(1) the packet is a generic data or signalization packet which requires no processing by packet-access block PSRH,
(2) the packet is a booking packet CRP (which as mentioned is generated in block PSRH),
(3) the packet is of the channel-requesting type CAR (or CAI) which demands processing in block PSRH.

In the case of a generic packet, logic LC1 is informed by block PSH that a packet is to be transmitted (TXPCK), requests of logic AA the access (PTR) and waits for that logic to communicate the possibility of transmission (AWAITING CHANNEL PCK). Here only the case is considered in which access is possible. When logic LC1 receives signal INTX from logic AA, it requests block PSH to forward to buffer B1 the packet (ABTX) which is to be delivered by that buffer to the bus (TRANSMISSION PCK). If the packet has been correctly transmitted from block PSH to buffer B1 and from there to the bus, the end of transmission is signaled from block PSH to logic LC1 and thence to logic AA (incoming and outgoing signals ENDTX); logic LC1 then returns to the resting state. If the packet has given rise to collision (COLTX), block PSH is requested to interrupt transmission (STP) and another transmission possibility is awaited.

In the case of a booking packet, logic LC1 receives from network GS the forwarding request TCP; under these conditions it predisposes multiplexer MX1 to let such a packet through (SCHEDULE CRP). The subsequent operations, from the request PTR of access to the bus until the transmission end, are analogous to those of a generic pack, except that the packet-sending request ABTX, the command STP of interrupting the transmission in case of collision and the end-of-transmission signal reaching logic LC1 are exchanged with the network GS in which packet CRP is prepared and not with block PSH; besides, in case of successful transmission, an acknowledgement CPT of occurred transmission is sent to network GS.

In the case of packets CAR/CAI, upon receiving the information (TXCA) that the packet is ready in block PSH, logic LC1 positions multiplexer MX1 so as to insert number NCP into the packet (SCHEDULE CA), and the operations go on as in the first instance.

(5) Logic LC2

Figure 20:
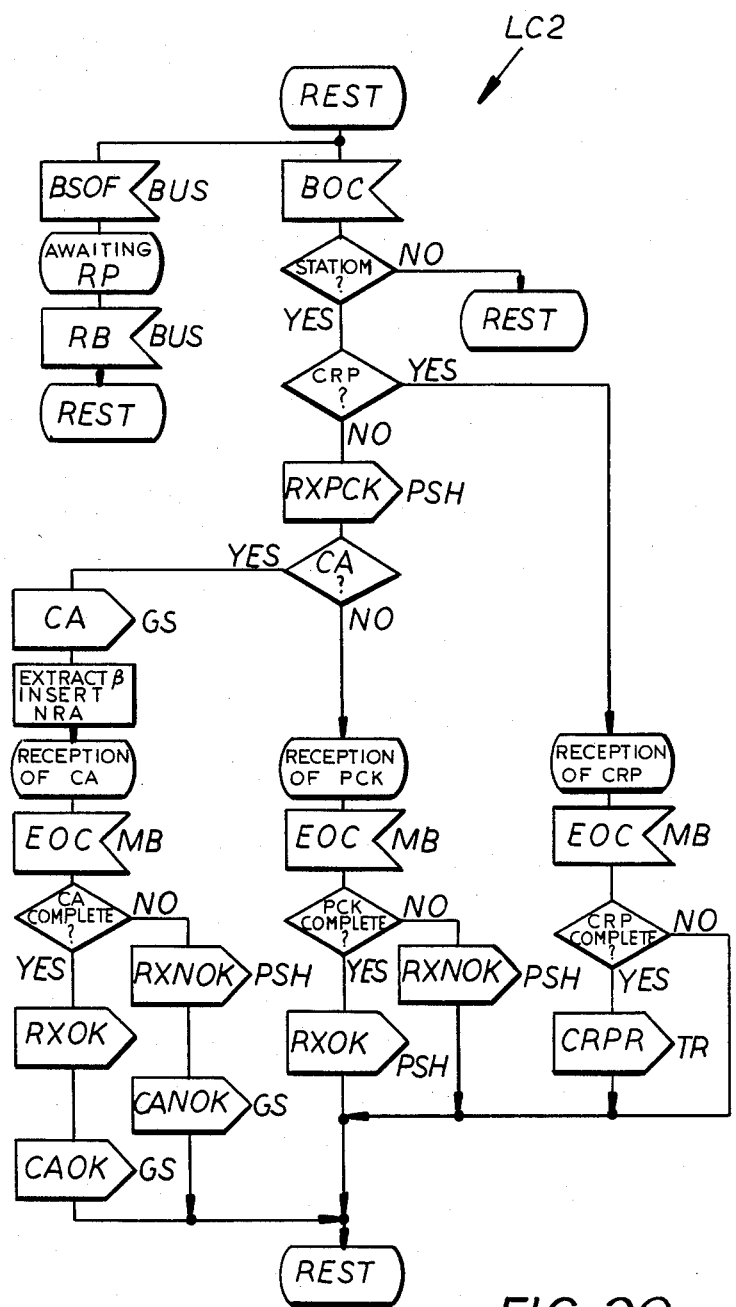

The reception of packets from the bus is controlled by logic LC2 as shown in FIG. 20. Like the access to the bus in transmission, in case of an already formed frame the reception is possible ionly in the packet region RP. Then, whenever the circuit region RC begins (BSOF), logic LC2 passes to a state of wait for region RP and, when that region begins (RB), it re-enters a rest condition waiting for the arrival of a packet indicated by the beginning-of-carrier signal BOC. If, as determined in an inquiry "STATION?", the packet is not addressed to the station associated with logic LC2, the latter returns to its rest condition; otherwise it checks in another inquiry whether the packets are booking packets CRP or signalization packets CAR, CAI. Inquiries "STATION?", "CRP?", "CA?" are carried out by data receiver RIC (FIG. 3) which in the affirmative case supplies logic LC2 with signals ADR, CRPR, CA; however, for simiplicity's sake, we have preferred to insert into the flow chart of FIG. 20 the inquiries themselves instead of the reception of responses emitted by unit RIC.

Taking this into account, if the received packet is a booking packet CRP, it is not to be forwarded to block PSH. Under these conditions the writing in buffer B2 is enabled (RECEPTION of CRP) and at the end of a packet (signal EOC supplied by bus monitor MB) a check is effected on whether the packet has been correctly received (inquiry CRP COMPLETED?). In the affirmative case, an acknowledgement is given (CRPR) to frame logic TR in block CSRH and the rest condition is re-established; in the negative case the rest condition is immediately resumed and the packet is not considered.

If the packet is not a booking packet, its arrival is signaled to block PSH (RXPCK) and a check is made (inquiry CA?) on whether such packet is a channel request CAR or CAI which demands processing in block PSRH. In the negative case (generic data or signalization packet), the packet is stored in buffer B2, FIG. 3 (RECEPTION OF PCK), and at the end of the packet (EOC) its completeness is checked (PCK COMPLETE?) and the correct (RXOK) or incorrect (RXNOK) reception is signaled to block PSH; in both instances the rest condition is resumed.

In the case of a packet CAR or CAI, logic LC2 predisposes switch MX2 so as to extract number β and insert number NRA (EXTRACT β/INSERT NRA), and the packet is stored in buffer B2 (RECEPTION OF CA).

At the end of reception (EOC), the completion is checked (CA COMPLETE?), the correct (RXOK, CAOK) or incorrect (RXNOK, CANOK) packet reception is signaled to block PSH and network GS and the resting state is re-entered.

Now the operations carried out by the components of block CSRH to establish or release a connection will be summarized, considering first an outgoing channel and then an incoming channel.

As a first operation, block CSRH is made to intervene by signal IRTX sent to network GS (see FIG. 16), which causes the emission toward logic LC1 of the request TCP for booking-packet transmission. After circuits GSIM and MUX (FIG. 4) have received the acknowledgement CPT of such transmission, counter C3 (FIG. 10) in section GIR pertaining to the available register loads, in response to signal MEM emitted by block GSIM, the number NCTA of the channel assigned to that transmission and the register is seized for the transmission (signal IMP emitted by block GSIM, FIG. 4), passing to the busy state. The booking acknowledgment is communicated to logic LCC (FIG. 3) together with the number NRA of the seized register. Besides, the number NCTA of the channel assigned to the communication is made available to logic LC1 as signal NCP, until the correct transmission of packet CAR. From the frame subsequent to that in which the seizure has taken place, in accordance with the channel identified in counter C3 (whose number may be updated by the counter to take into account the release of preceding channels), section GIR (FIGS. 5 and 10) enables logic LCC (FIG. 3), through signal ABR, to control the reading of an information block relevant to the communication in the associated buffer M1 ... Mk. Such block will have no information content until all the checks on the possibility of establishing the communication with the desired characteristics have been carried out.

During reception, the seizure of an available register takes place as soon as block GSIM (FIG. 4) receives signal CA indicating the arrival of a packet CAR (at the called party) or CAI (at the calling party). The number extracted from the arrived packet is loaded into the available register and the identification NRA of the register in which such number has been stored is read out. The seizure becomes definitive when the correct packet reception is acknowledged; otherwise the register is released. From the subsequent frame on, logic LCC (FIG. 3) is enabled through signal ABR to cause storage of the information in the buffer connected to the register, each time the channel assigned to the communication occurs.

The release of a transmitting channel at the end of the communication is controlled by signal FREE coming from logic LCC and relevant to the seized register: this signal, as described in connection with FIG. 10, resets the counter C3 and releases the register, starting again the algorithm which determines its availability.

For a receiving channel, the release is automatic when, in the expected channel, the activity on the bus is missing for a time exceeding guard time Tg. At the end of transmission of the last channel handled by the module involved, signal ACRX (see FIG. 17) is sent to logic LCC (FIG. 3) which releases the buffer as described. In this case, too, the register availability is again updated.

If a trunk module which handles hybrid or synchronous frames is considered instead of a subscriber's module, the operations inside the module are perfectly analogous.

Only the structure of block PSH and the dialog of block CH with the external devices are to be changed, to take into account the characteristics of the external network. Besides, the nodal module MN (FIG. 1) will contain information on the routing toward the trunks rather than toward the subscribers.

The preceding description of circuitry and operation is based on the assumption that the channels have a constant band length for the whole duration of the communications and the frames are of constant duration. As stated, our invention is generally applicable also to the case of variable-band channels and variable-duration frames.

The modifications necessary when band variability is required only by speech communications are depicted in subsequent Figures by way of example.

The activity of a speech source is known to be characterized by the alternance of talkspurts, having an average duration of about 1.3 s, and silences, having an average duration of about 1.6 s. See, for example, commonly owned U.S. Pat. No. 4,317,195 in the names of G. Barberis et al. The communication may thus be assigned a channel with suitable band length (which for simplicity's sake may be considered equal for all speech communications) only during talkspurts or emission (E), while no channel is assigned during silences or pauses (P). In other words, techniques similar to the one known as TASI (Time-Assigned Speech Interpolation—see above-identified paper by Devault et al), already used in classic telephony for the better exploitation of high-cost transmission lines, may be used in hybrid-frame switching. The dynamic management of speech communications is to be carried out so as to reduce to a minimum the auxiliary control signalizations (which may be represented by flags Hp, Hep, Hpe respectively indicating silence periods and talkspurt-to-silence and silence-to-talkspurt transitions in a channel), and not to interfere with other circuit-switched communications not involved in the dynamic management; the latter communications must still dispose of their channels for the whole duration of the communication. The alternance of talkspurts and silences does not affect the procedures of setup and release of a channel for a speech communication, while for an ongoing communication the channel release during silences is to be avoided and the possibility of resuming the communication in accordance with the subsequent emission is to be checked. During silences and in the presence of a silence-to-talkspurt transition, only flags Hp, Hpe will be transmitted, while in the presence of a talkspurt-to-silence transition both the remaining part of the information block and flag Hep will be transmitted.

The lack of activity due to a silence will cause the compaction of the circuit region exactly like the release, but with no channel renumbering.

The band left temporarily free can be occupied by other communications which, owing to circuit-region compaction, will be assigned new channels. For that reason, in the case of silence-to-talkspurt transitions, the band necessary to resume transmission may be unavailable; in that event the subscriber's information gets lost (or is to be stored in a buffer memory up to a maximum time beyond which there is still a loss). Nonavailability of a circuit can also last a plurality of frames depending on the instantaneous traffic.

The possible information loss in this case, like in TASI systems, is concentrated in the initial part of the talkspurt and is uniformly distributed among all the ongoing speech communications.

Obviously, a buffer-memory system is to be provided in order to limit fluctuations in the duration of the time intervals separating two successive information blocks relating to the same channel, such fluctuations being due to the alternation of silences and talkspurts.

Figure 21:
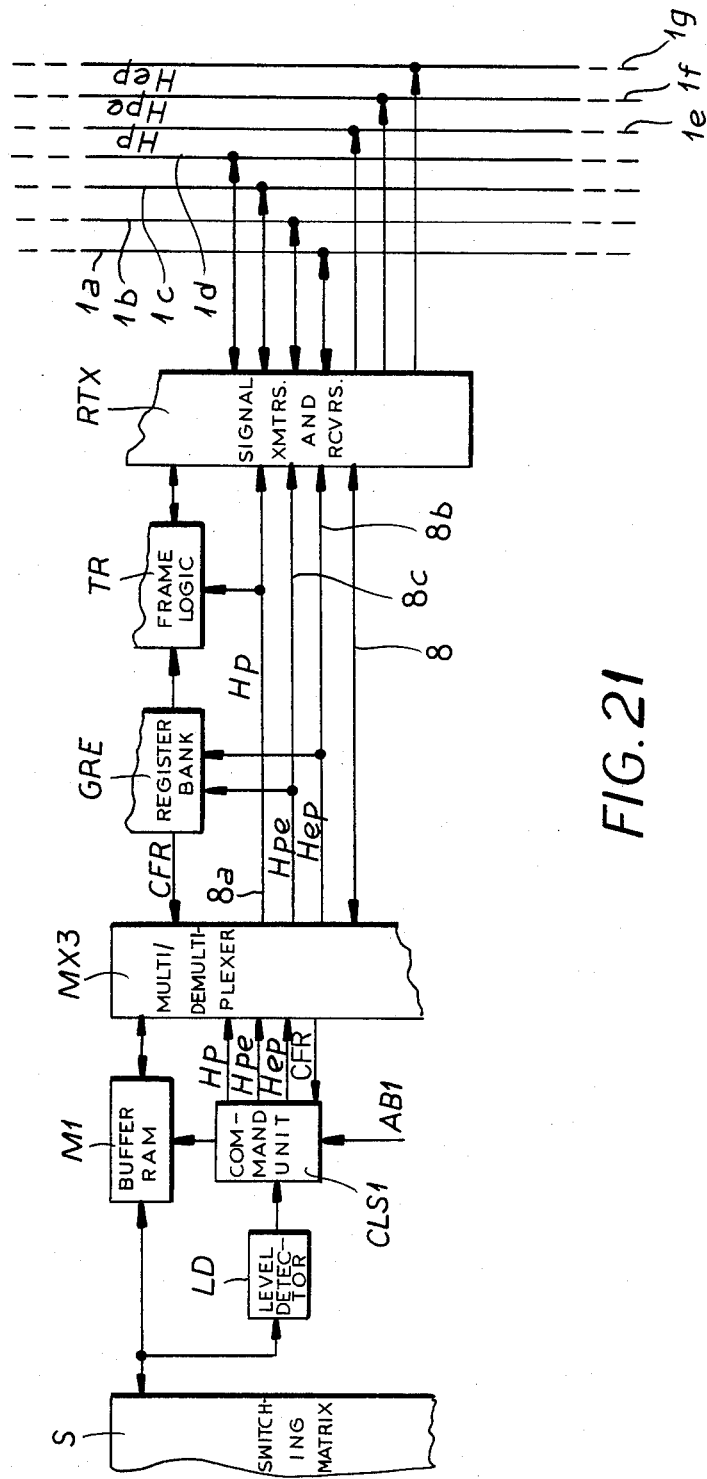
FIG. 21 is a partial block diagram of a modification of the circuitry of FIG. 3.

To take into account these modifications, part of the layout of FIG. 3 becomes as shown in FIG. 21 pertaining to the most interesting case, in which the silence suppression takes place in the node.

For simplicity's sake, only one of buffers M1 . . . Mk (here M1) and only the signals of interest for the modification are shown. A device LD is provided in circuit-flow controller CH between matrix S and the buffer to detect the average level of the speech signal at the buffer input, e.g. during a period corresponding to duration Z of a frame.

Obviously, device LD is active only for buffers assigned to transmission toward the bus and supplies the buffer controller with signals indicating the communication conditions (silence, talkspurt, silence-to-talkspurt transition and vice versa) to enable storage in buffer M1, if necessary.

Controller CLS1, upon receiving signal AB1, causes in turn the emission of the contents of buffer M1 in alternative or in addition to flaps Hp, Hpe, Hep, which are forwarded through the homonymous wires to coupler RTX and therefrom to three additional wires 1e, 1f, 1g of bus 1 designed to convey that signalization. Analogously to the provisions made for the input-output wires of buffers M1 . . . Mk, also the terns of wires outgoing from all the controllers will be concentrated into a single tern (8a, 8b, 8c) by a multiplexer MX3. Flags Hp, Hpe, Hep are also sent to block CSRH; more particularly, the silence flag Hp is sent to part GCT (FIG. 4) of logic TR (in particular to gate P1, FIG. 6) to keep the corresponding channel active; the transitions may be communicated to a verification circuit VD (FIG. 22), associated with each register in access block CSRH, which in response to silence-to-talkspurt transition signals to the associated controller CLS the possibility of resuming the transmission (i.e. the band availability on the bus) and predisposes that controller to send the memory contents or the silence flag Hp over the line.

Under the hypothesis that all speech channels require the same band during talkspurts or emissions, this availability signal can be generated by counting the number of speech channels which can be allocated in the band occupied by an existing packet region RP.

A possible implementation of circuit VD, as represented in FIG. 22, comprises a counter CX stepped by the internal clock pulses ICK occurring in the packet region RP identified by signals RB and TIMOTZ which, through a flip-flop FF12, enable or disable an AND gate P36 supplying the pulses ICK to counter CX; the counter emits a signal NCD indicating the number of speech channels which can be transmitted during such time.

Upon the arrival of signal SOF of the subsequent frame, value NCD is loaded into another counter CY and is incremented or decremented by one unit by talkspurt-to-silence or silence-to-talkspurt transitions, respectively, detected on the bus. Upon occurrence of transition Hpe(r) relevant to the register with which the circuit is associated, the altered value NCDA reached is compared with 0 in a comparator CM which emits signal CFR relevant to this register if that value is not 0.

A premature channel release in the periods corresponding to silences or pauses can be easily prevented by sending to component GCT the silence flag Hp detected on wire 1e to increment the counter C1 (FIG. 6) which generates the current number of active channels.

Flow charts of the operations carried out by a command unit CLS for speech-channel control are shown in FIGS. 23 and 24. Let us consider first the emission or talkspurt state (E), FIG. 23; on the arrival of an enabling signal AB from logic LCC, the buffer is read (TXV) and the logic remains in state E. When the flag Hep indicating the talkspurt-to-silence transition arrives from level detector LD, controller CLS passes to a transition state EP, and upon the arrival of enabling signal AB the possibly remaining portion of the information (TXV) and transition flag Hep are sent out as controller CLS passes to a silence state P.

For all the frames in which the silence lasts (FIG. 24), in the presence of the enabling signal AB supplied by logic LCC only silence flag Hp is transmitted. When the silence-to-talkspurt transition is signaled by flag Hpe as indicated at a step PE, controller CLS passes into a transition state PE and the logic value of signal CFR is checked (inquiry CFR=0?) in response to signal AB. If CFR=0, only silence flag Hp is emitted and the transition state (PE) is maintained; if, on the contrary, CFR≠0, reading in the buffer memory (signal TXV) is enabled, signal Hpe is emitted and state E is reached.

If silence suppression takes place already at the subscriber station, the procedure is perfectly similar except that the signalization on the state of the speech source is sent out by the subscriber station itself and level detectors LD are no longer needed.

We claim:

1. A distributed switching node for an integrated-services telecommunication network handling circuit-switched and packet-switched communications, comprising a plurality of independent modules each individually communicating with an associated external line and with an internal bus common to all said modules, each module being divided into an input/output portion communicating with the associated external line and an interface portion with a two-way connection to said bus whereby incoming and outgoing communications can be exchanged with said associated external line by way of the associated modules and said bus, said interface portion comprising first and second flow control means for packet switched and circuit switched communications, respectively, said associated external line include local lines extending to subscriber stations and trunk lines extending to other nodes, said interface portion being substantially identical for all said modules said input/output portion including first access means, for enabling a bidirectional transfer of packet-switched communications between said first flow-control means and said bus and second access means for enabling a bidirectional transfer of circuit-switched communications between said second flow-control means and said bus, said second flow-control means comprises a bank of buffers for temporarily storing information blocks coming from and destined for said bus, a set of command units respectively controlling loading and readout of said buffers, and a logic circuit alternatively setting said command units for reading and writing, said second access means including logic circuitry for forming hybrid frames each divided into a circuit region and a packet region each accommodating a plurality of channels for outgoing and incoming circuit-switched communications and for outgoing and incoming packet-switched communications, respectively, in time slots of variable band width and number, the channels of said circuit region being established in response to request signals arriving in said packet region from said first access means and carrying indications of the required frame length, each channel of said circuit region being numerically identified for facilitating a foreshortening of said circuit region upon a release of a preceding channel, said logic circuit exchanging information with said first flow-control means and with said second access means.

2. A node as defined in claim 1 wherein said second access means comprises signal-processing means, channel-forming means controlled by said signal-processing means, and an assembly of as many registers as there are buffers in said second flow-control means, said registers storing the numerical identifications of circuit-region channels respectively associated therewith for conveying the information blocks temporarily stored in corresponding buffers of said bank, said registers being provided with respective supervisory circuits controlling the availability of free registers and reporting such availability to said signal-processing means.

3. A node as defined in claim 2 wherein said supervisory sections are interconnected in a cascade preventing the establishment and reporting of availability of more than one register at a time.

4. A node as defined in claim 2 wherein said second access means further comprises decoding means connected to said bus for determining the activity of established time slots and generating, in the event of an inactivity period longer than a predetermined guard time, a release-indicating signal, said registers including counters loadable by said signal-processing means with the number of active channels and decrementable by occurrences of said release-indicating signal for updating the length of said circuit region.

5. A node as defined in claim 2 wherein said first access means comprises a first control logic for handling outgoing channel requests from said first flow-control means and a second control logic for handling incoming channel requests from said bus, said control logics exchanging information with said signal-processing means.

6. A node as defined in claim 2 wherein said external lines include voice lines connected to speech sources emitting talkspurts separated by pauses with intervening transition periods, said second flow-control means of a module connected to a voice line including level-detecting means inserted between said voice line and said buffers for enabling same to send signals indicative of transition periods to said bus.

7. A node as defined in claim 6 wherein said second access means includes verification means associated with each of said registers for ascertaining the possibility of resumption of voice transmission in response to signals indicating pause-to-talkspurt transitions.

8. A node as defined in claim 7 wherein said verification means comprises counting means incrementable by signals indicative of pause-to-talkspurt transitions and decrementable by signals indicative of talkspurt-to-pause transitions.

* * * * *